US012535399B2

(12) United States Patent
Lo et al.

(10) Patent No.: US 12,535,399 B2
(45) Date of Patent: Jan. 27, 2026

(54) CELL SORTING DEVICE AND METHOD

(71) Applicant: The Regents of the University of California, Oakland, CA (US)

(72) Inventors: Yu-Hwa Lo, San Diego, CA (US); Yi Gu, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1194 days.

(21) Appl. No.: 17/275,994

(22) PCT Filed: Sep. 16, 2019

(86) PCT No.: PCT/US2019/051339
§ 371 (c)(1),
(2) Date: Mar. 12, 2021

(87) PCT Pub. No.: WO2020/056422
PCT Pub. Date: Mar. 19, 2020

(65) Prior Publication Data
US 2022/0034785 A1    Feb. 3, 2022

Related U.S. Application Data

(60) Provisional application No. 62/731,745, filed on Sep. 14, 2018.

(51) Int. Cl.
*G01N 15/1433* (2024.01)
*C12M 1/00* (2006.01)
(Continued)

(52) U.S. Cl.
CPC ......... *G01N 15/1433* (2024.01); *C12M 47/04* (2013.01); *G01N 15/1436* (2013.01);
(Continued)

(58) Field of Classification Search
CPC .......... G01N 15/1433; G01N 15/1436; G01N 15/147; G01N 15/149; G01N 2015/1006;
(Continued)

(56) References Cited

U.S. PATENT DOCUMENTS 7,023,546 B1    4/2006   McMillan
9,423,353 B2    8/2016   Diebold et al.
(Continued)

FOREIGN PATENT DOCUMENTS

CN    102037343 A    4/2011
CN    102439416 A    5/2012
(Continued)

OTHER PUBLICATIONS

EPO, Extended European Search Report for European Application No. 19860464.7. Mail Date: May 11, 2022. 10 pages.
(Continued)

*Primary Examiner* — Larry D Riggs, II
*Assistant Examiner* — Guozhen Liu
(74) *Attorney, Agent, or Firm* — Wilson Sonsini Goodrich & Rosati

(57) ABSTRACT

A cell sorting system is provided to comprise: an imaging device including abeam scanner scanning abeam along a first direction to obtain a cell image data including fluorescent information or cell image information of a cell, the beam applied to the cell flowing in a channel along a second direction with an angle to the first direction; a data processing and control device in communication with the imaging device, the data processing and control device including a processor configured to process the cell image data obtained by the imaging device to determine one or more properties associated with the cell from the processed cell image data and to produce a control command based on a comparison of the determined one or more properties with a sorting
(Continued)

criteria, and a cell sorting device in communication with the imaging device and the data processing and control device.

19 Claims, 21 Drawing Sheets

(51) Int. Cl.
   *G01N 15/10* (2024.01)
   *G01N 15/14* (2024.01)
   *G01N 15/1434* (2024.01)
   *G01N 15/149* (2024.01)

(52) U.S. Cl.
   CPC ... *G01N 15/147* (2013.01); *G01N 2015/1006* (2013.01); *G01N 2015/1402* (2013.01); *G01N 2015/144* (2013.01); *G01N 15/149* (2024.01)

(58) Field of Classification Search
   CPC ..... G01N 2015/1402; G01N 2015/144; G01N 15/1434; G01N 2015/1454; C12M 47/04
   See application file for complete search history.

(56) References Cited

U.S. PATENT DOCUMENTS

| | | |
|---|---|---|
| 9,778,164 B2 | 10/2017 | Lo et al. |
| 11,371,929 B2 | 6/2022 | Lo et al. |
| 2002/0001089 A1 | 1/2002 | Price |
| 2004/0005635 A1 | 1/2004 | Goix et al. |
| 2009/0023155 A1 | 1/2009 | Abbott |
| 2009/0208072 A1 | 8/2009 | Seibel et al. |
| 2010/0238442 A1 | 9/2010 | Heng et al. |
| 2011/0090500 A1 | 4/2011 | Hu et al. |
| 2012/0078531 A1 | 3/2012 | Lo et al. |
| 2012/0140223 A1 | 6/2012 | Mitchell et al. |
| 2013/0048875 A1 | 2/2013 | Yamaguchi et al. |
| 2013/0083315 A1 | 4/2013 | Lo et al. |
| 2014/0071452 A1 | 3/2014 | Fleischer |
| 2014/0186938 A1 | 7/2014 | Heng et al. |
| 2014/0339446 A1 | 11/2014 | Yamamoto et al. |
| 2015/0268244 A1 | 9/2015 | Cho et al. |
| 2016/0003729 A1 | 1/2016 | Lo et al. |
| 2016/0033386 A1 | 2/2016 | Reed et al. |
| 2017/0082531 A1 | 3/2017 | Okada et al. |
| 2017/0268981 A1 | 9/2017 | Diebold et al. |
| 2019/0072897 A1 | 3/2019 | Jepsen et al. |
| 2019/0120746 A1 | 4/2019 | Calvin |
| 2020/0033192 A1 | 1/2020 | Calvin |
| 2021/0173195 A1 | 6/2021 | Hillman |
| 2021/0364411 A1 | 11/2021 | Kaduchak et al. |
| 2022/0011216 A1 | 1/2022 | Lo et al. |
| 2022/0299421 A1 | 9/2022 | Lo et al. |

FOREIGN PATENT DOCUMENTS

| | | |
|---|---|---|
| CN | 102869982 A | 1/2013 |
| CN | 104266955 A | 1/2015 |
| CN | 104502255 A | 4/2015 |
| CN | 106520535 A | 3/2017 |
| CN | 107209041 A | 9/2017 |
| DE | 102012214897 B3 | 7/2013 |
| EP | 3144662 A1 | 3/2017 |
| JP | H03146848 A | 6/1991 |
| JP | 2011512543 A | 4/2011 |
| JP | 2012521540 A | 9/2012 |
| JP | 2014150412 A | 8/2014 |
| JP | 2016524703 A | 8/2016 |
| JP | 2017058352 A | 3/2017 |
| WO | WO-2014186461 A1 | 11/2014 |
| WO | 2015/143041 A1 | 9/2015 |
| WO | 2016/054293 A1 | 4/2016 |
| WO | WO-2017161247 A1 | 9/2017 |
| WO | 2017197271 A1 | 11/2017 |
| WO | 2017214572 A1 | 12/2017 |

OTHER PUBLICATIONS

CNIPA, First Office Action to Chinese Application No. 201980073976.2, mailed on Dec. 26, 2023, 15 pages with unofficial English translation.

Dai Wei-de et al., "Laser Scanning Confocal Fluorescence Microimaging System on Studying the Subcellular Localization of Photosensitizers," Chinese J Laser Med Surg, 2004, vol. 13, No. 1, 12-17.

JPO, Office Action for Japanese Application No. 2021-514044, mailed on Oct. 3, 2023, 11 pages with unofficial translation.

ISA, International Search Report and Written Opinion for International Patent Application No. PCT/US2019/051339. Mailing Date: Dec. 4, 2019. 15 pages.

Nitta, N. et al. "Intelligent Image-Activated Cell Sorting" Cell, 2018, vol. 175. 25 pages.

Ota, S. et al. "Ghost cytometry" Science, 2018, vol. 360, pp. 1246-1251.

EP19753770.7 European Examination Report dated Jul. 15, 2024.

EP19860464.7 European Examination Report dated Mar. 27, 2024.

Gu, Yi et al.: Machine Learning Based Real-Time Image-Guided Cell Sorting and Classification. Cytometry Part A 95(5):499-509 (2019).

Gualda, Emilio J. et al.: Three-dimensional imaging flow cytometry through light-sheet fluorescence microscopy. Cytometry Part A 91(2):144-151 (2017). doi: 10.1002/cyto.a.23046. https://doi.org/10.1002/cyto.a.23046.

Han, Yuanyuan et al.: Cameraless high-throughput three-dimensional imaging flow cytometry. Optica 6:10 (2019).

Han, Yuanyuan et al.: Review: Imaging Technologies for Flow Cytometry. Lab Chip. 16(24):4639-4647 (2016). doi:10.1039/c6lc01063f.

Notice of Allowance dated May 17, 2022 issue in U.S. Appl. No. 16/970,304.

PCT/US2019/018631 International Search Report and Written Opinion dated May 1, 2019 (Publ. No. WO2019161406).

PCT/US2023/076279 International Search Report dated Apr. 12, 2024 (Publ. No. WO2024077266).

PCT/US2024/029892 International Search Report and Written Opinion dated Sep. 9, 2024.

Tang, Rui et al.: Low-latency label-free image-activated cell sorting using fast deep learning and AI inferencing. Biosensors and Bioelectronics 220 (2023).

U.S. Appl. No. 17/805,446 Office Action dated Nov. 4, 2024.

Almendro, V. et al.: Cellular Heterogeneity and Molecular Evolution in Cancer. Annu. Rev. Pathol. Mech. Dis. 8, 277-302 (2013).

Altschuler, Steven J et al.: Cellular heterogeneity: do differences make a difference? Cell 141(4):559-563 (2010).

Amara, J.F. et al.: Intracellular protein trafficking defects in human disease. Trends Cell Biol. 2, 145-149 (1992).

Barteneva, N.S. et al.: Imaging flow cytometry: coping with heterogeneity in biological systems. J. Histochem. Cytochem. 60, 723-33 (2012).

Basiji, D.A. et al.: Cellular Image Analysis and Imaging by Flow Cytometry. Clin Lab Med. 27, 653_670 (2007).

Chang, J.T. et al.: Asymmetric T Lymphocyte Division in the Initiation of Adaptive Immune Responses: Science. 315, 1187-1191 (2007).

Collins, S.J. et al.: Continuous growth and differentiation of human myeloid leukaemic cells in suspension culture. Nature. 270, 347-349 (1977).

Conchello, J.A. et al.: Optical sectioning microscopy. Nat. Methods. 2, 920-931 (2005).

Dada, et al.: Simplified Sheath Flow Cuvette Design for Ultrasensitive Laser Induced Fluorescence Detection in Capillary Electrophoresis. Analyst. Jul. 7, 2012; 137(13): 3099-3101.

Dickey, J.S. et al.: H2AX: functional roles and potential applications. Chromosoma. 118, 683-692 (2009).

Goda, K. et al.: High-throughput single-microparticle imaging flow analyzer. Proc. Natl. Acad. Sci. 109, 11630-11635 (2012).

Gomez-Navarro, N. et al.: Protein sorting at the ER-Golgi interface. J. Cell Biol. 215, 769-778 (2016).

(56) References Cited

OTHER PUBLICATIONS

Hagiwara, Y. et al.: 3D-structured illumination microscopy reveals clustered DNA double-strand break formation in widespread yH2AX foci after high LET heavy-ion particle radiation. Oncotarget. 8, 109370-109381 (2017).

Han, Yuanyuan, et al.: Imaging Cells in Flow Cytometer Using Spatial-Temporal Transformation. Scientific Reports 5:13267, 1-10 (2015).

Heath, et al.: Single-cell analysis tools for drug discovery and development. Nature reviews Drug discovery 15.3 (2016): 204.

Huang, F. et al.: Ultra-High Resolution 3D Imaging of Whole Cells> Cell. 166, 1028-1040 (2016).

Ivashkevich et al.: Use of the y-H2AX assay to monitor DNA damage and repair in translational cancer research. Cancer Lett. 327(1-2):123-133 (2012).

Janssen, A. et al.: Chromosome Segregation Errors as a Cause of DNA Damage and Structural Chromosome Aberrations. Science. 333, 1895-8 (2011).

Kuo, L.J. et al.: y-H2AX—A Novel Biomarker for DNA Double-strand Breaks. In Vivo 22 (3) 305-309 (2008).

Laerum, O.D. et al.: Clinical application of flow cytometry: A review. Cytometry. 2, 1-13 (1981).

Ling, J.Q. et al.: CTCF mediates interchromosomal colocalization between Igf2/H19 and Wsb1/Nf1. Science. 312, 269-72 (2006).

Liu, P.Y. et al.: Cell refractive index for cell biology and disease diagnosis: past, present and future. Lab Chip. 16, 634-644 (2016).

Mueller, F. et al.: FISH-quant: automatic counting of transcripts in 3D Fish images. Nat. Methods. 10, 277-278 (2013).

Nitta, Nao. et al.: Intelligent Image-Activated Cell Sorting. Cell 175(1):266-276.e1-e13 (2018).

Olkkonen, V.M. et al.: When intracellular logistics fails—genetic defects in membrane trafficking. J. Cell Sci. 119, 5031-45 (2006).

Ota, Sadao, et al.: Ghost Cytometry. Science, vol. 360, 1246-1251 (2018).

Pelkmans, L.: Using Cell-to-Cell Variability—A New Era in Molecular Biology. Science. 336, 425-426 (2012).

Pitrone et al.: OpenSPIM: an open-access light-sheet microscopy platform. Nat Methods. Jul. 2013;10(7):598-599.

Roberts, J.P. et al.: Phenotypic Drug Discovery with High Content Screening. (2015), (available at www.perkinelmer.com).

Snijder, B. et al.: Origins of regulated cell-to-cell variability. Nat. Rev. Mol. Cell Biol. 12, 119-125 (2011).

Telford, W.G. et al.: Flow cytometry of fluorescent proteins. Methods. 57, 318-330 (2012).

Zhang, Q. et al.: Quantitative refractive index distribution of single cell by combining phase-shifting interferometry and AFM imaging. Sci. Rep. 7, 2532, 1-10 (2017).

Capture cell images using beam scanning

PMT detected waveform

Reconstructed cell images

Extract imaging features and generate gating criteria

Real-time image-guided sorting

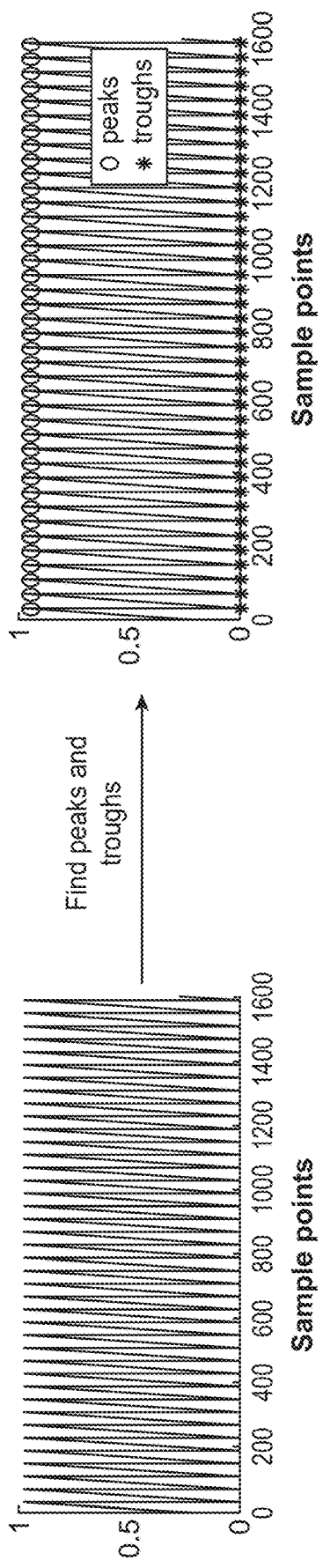
FIG. 9A
Find peaks and troughs
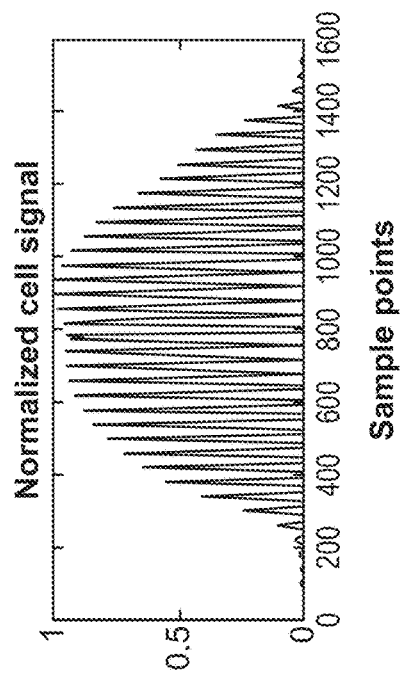
FIG. 9B
FIG. 9C

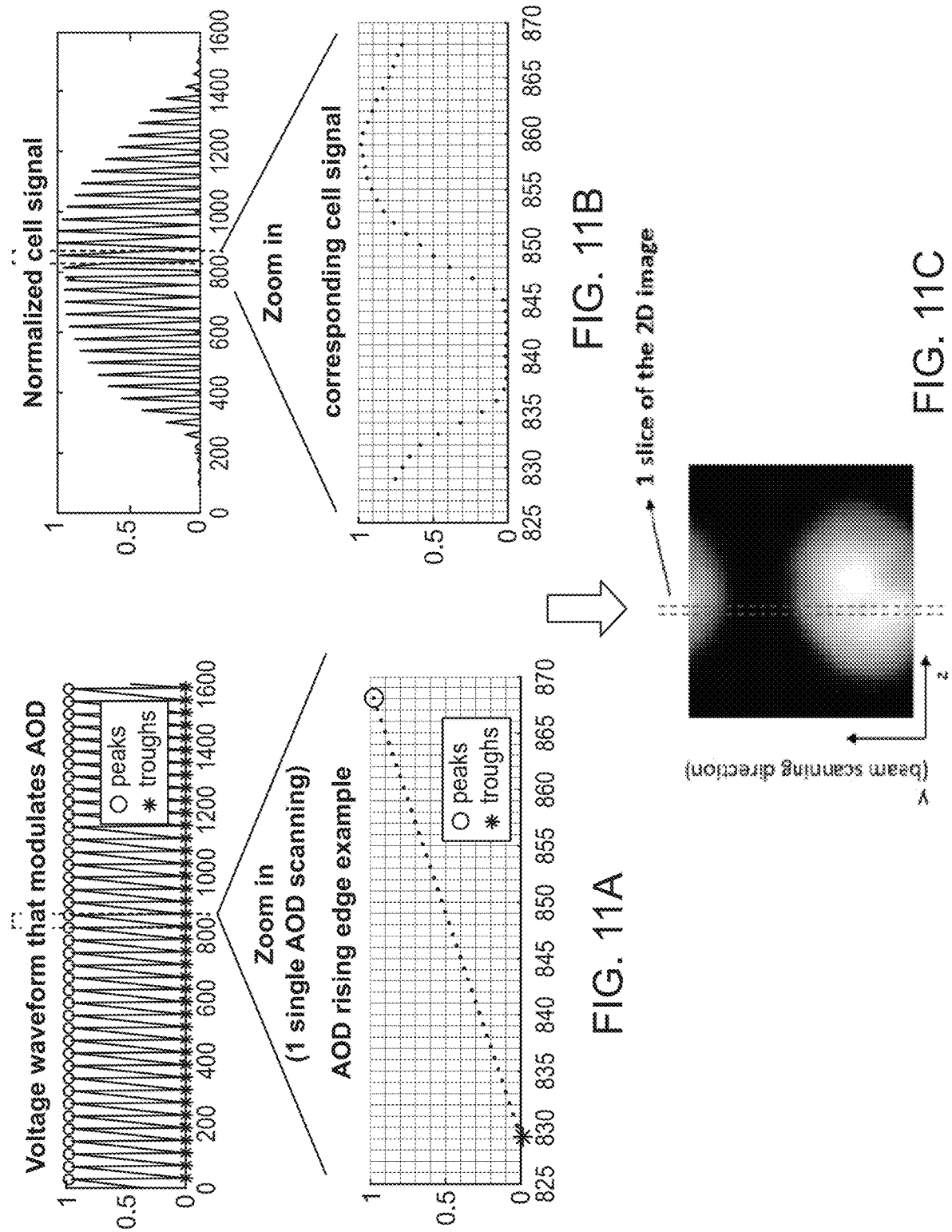

CELL SORTING DEVICE AND METHOD

CROSS-REFERENCE TO RELATED APPLICATIONS

This patent document is a 371 National Phase Application of International Application No. PCT/US2019/051339, filed on Sep. 16, 2019, which claims priorities to and benefits of U.S. Provisional Patent Application No. 62/731,745 entitled "CELL SORTING DEVICE AND METHOD" filed on Sep. 14, 2018. The entire content of the aforementioned patent applications is incorporated by reference as part of the disclosure of this patent document.

STATEMENT REGARDING FEDERALLY SPONSORED RESEARCH OR DEVELOPMENT

This invention was made with government support under DA042636 awarded by the National Institutes of Health. The government has certain rights in the inventions.

TECHNICAL FIELD

This patent document relates to system, devices, and processes for cell sorting technologies

BACKGROUND

Cell sorting, including cell sorting at the single-cell level, has become an important feature in the field of flow cytometry as researchers and clinicians become more interested in studying and purifying certain cells, e.g., such as stem cells, circulating tumor cells, and rare bacteria species. Cell sorting can be achieved by various techniques. Conventional cell sorting technologies are purely based on the fluorescent and/or scattering intensity, without resorting to high-content cell images that contains detailed subcellular information.

SUMMARY

Techniques, systems, and devices are disclosed for implementing an image-guided cell sorting.

In one aspect, a cell sorting system is provided to comprise: an imaging device including a beam scanner scanning a beam along a first direction to obtain a cell image data including fluorescent information or cell image information of a cell, the beam applied to the cell flowing in a channel along a second direction with an angle to the first direction; a data processing and control device in communication with the imaging device, the data processing and control device including a processor configured to process the cell image data obtained by the imaging device to determine one or more properties associated with the cell from the processed cell image data and to produce a control command based on a comparison of the determined one or more properties with a sorting criteria, wherein the control command is produced during the cell flowing in the channel and is indicative of a sorting decision determined based on one or more cellular attributes ascertained from the cell image data; and a cell sorting device in communication with the imaging device and the data processing and control device, the cell sorting device including two or more output paths branching from the channel in which the cell flows and configured to direct the cell into one of the two or more output paths based on the control command.

In another aspect, a method for sorting cells is provided. The method includes obtaining time-domain signal data of a cell by scanning a beam across a channel in which the cell travels in a first direction, the beam scanned through a second direction with an angle to the first direction; converting the time-domain signal data to a two-dimensional cell image; and processing the two-dimensional cell image to evaluate one or more properties of the cell with a sorting criteria and produce a control command to sort the cell based on one or more cellular attributes ascertained from the image signal data corresponding to the cell during cell flow in the channel.

In another aspect, a cell sorting system is disclosed. The cell sorting system includes a light source configured to direct an input light toward a cell flowing in a channel along a first direction; a beam scanner operatively coupled with the light source and arranged to scan a beam toward the cell to obtain a cell image data of the cell that includes fluorescent or light transmission information and cell image information, the scanning of the beam configured to proceed in a second direction with an angle with respect to the first direction; a data processing and control device in communication with the bean scanner, the data processing and control device including a processor configured to process the cell image data obtained by the beam scanner to detect an image feature that is associated with an illumination of the input light from the obtained cell image data and to produce a control command based on a comparison of the detected image feature with a sorting criteria; and a cell sorting device in communication with the data processing and control device, the cell sorting device including two or more output paths branching from the channel in which the cell flows and configured to direct the cell into one of the two or more output paths based on the control command.

In another aspect, a method for sorting cells is provided. The method includes obtaining image data of a cell flowing in a channel along a first direction by scanning a beam toward the channel along a second direction that forms an angle with respect to the first direction, the obtained image data including a fluorescent signal corresponding to fluorescent information of the cell or an optical transmission signal corresponding to cell image information of the cell; processing the obtained image data by detecting an image feature corresponding to an individual parameter of the obtained image data or a correlation between two or more parameters of the obtained image data, each of parameters individually or collectively representative of one or more properties of the cell; and comparing the detected image feature with a sorting criteria and producing a command to sort the cell based on the comparing.

In another aspect, a method for sorting cells is provided. The method comprises: generating a fluorescent signal including cell fluorescent information of a cell or an optical transmission signal including cell image information of the cell by scanning a beam along a first direction across a channel in which the cell travels along a second direction, the first direction and the second direction being non-parallel each other; detecting a cell image feature that is associated with at least one of the fluorescent signal or the optical transmission signal; comparing the detected cell image feature with a sorting criteria to produce a sorting command to sort the cell; and applying a signal to deflect the cell flowing in the channel to a corresponding channel based on the sorting command.

DESCRIPTION OF THE DRAWINGS

FIGS. 9A and 9B show examples of voltage waveforms before and after finding troughs and peaks of an AOD signal.

FIG. 9C shows an example of normalized cell signal.

FIGS. 11A to 11C illustrate examples of a voltage waveform of an AOD signal, a normalized cell signal, and a corresponding 2D image before a phase-shift conversion is performed.

DETAILED DESCRIPTION

Figure 1:
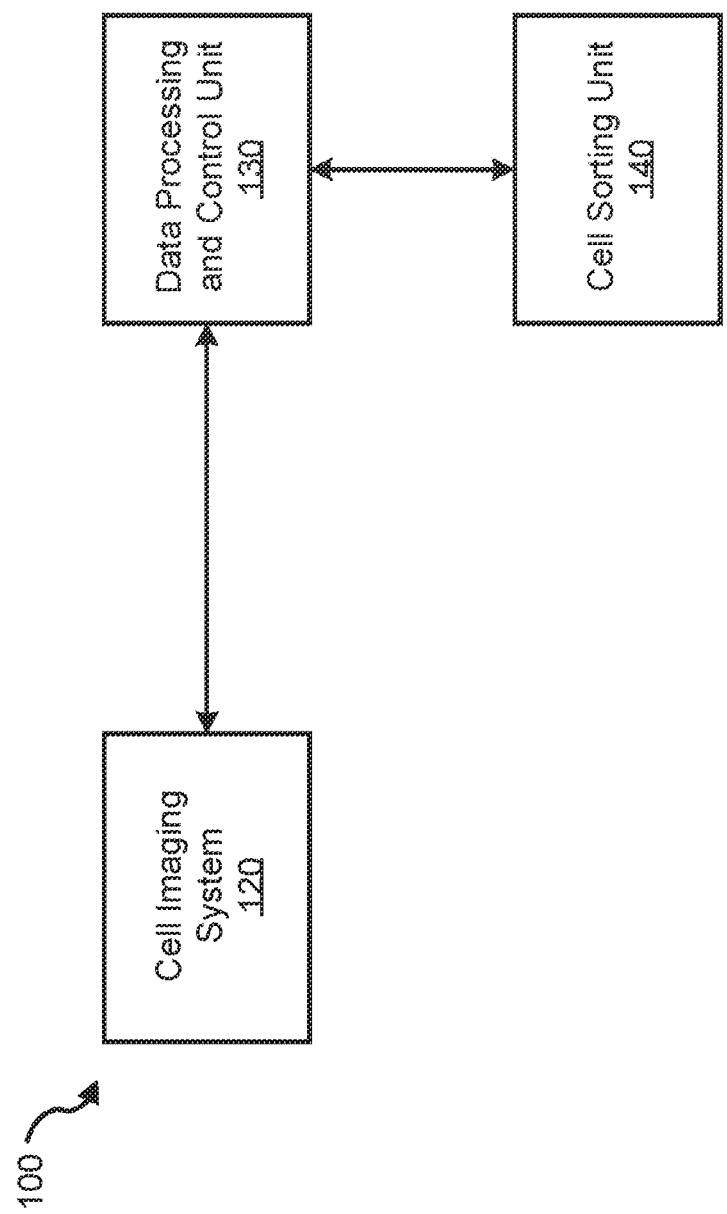
FIG. 1 shows a diagram of an example embodiment of an image-guided cell sorting system based on some implementations of the disclosed technology.

Disclosed are methods, devices and applications pertaining to an image-guided cell sorting system and method. The disclosed technology provides high throughput of flow cytometer and high information content of microscopy by obtaining cell image information using a controlled optical beam. In some implementations, cell image information of fast travelling cells is accessed by scanning an optical beam across an object by a fast beam scanner such as an Acousto-Optic Deflector (AOD) to enable faster cell-sorting operations. Some implementations of the disclosed technology also suggest reconstructing the cell image to reduce and prevent an error occurred during the obtaining the cell image. According to the suggested techniques, it is possible to provide the cell sorting techniques which can operate faster while providing more accurate and reliable results.

Conventional cell sorting technologies are purely based on the fluorescent and/or scattering intensity, without resorting to high-content cell images that contain detailed subcellular information. Fluorescence-activated cell sorting can only resolve cell-to-cell variations in fluorescence and optical scattering. To fill the technology gap, techniques for cell sorting using features derived from cell images are provided. Utilizing microfluidics, photonics, computation microscopy, real-time image processing and machine learning, some implementations of the disclosed technology can provide an image-guided cell sorting and classification system possessing the high throughput of flow cytometer and high information content of microscopy. According to the disclosed technology, high throughput of flow cytometer and high information content of microscopy can be achieved. Interested cell populations are sorted in real-time based on high-content spatial information extracted from the cell images. The disclosed technology provides combined imaging and sorting capabilities for the cells. Flow cytometer is a $6 B industry with 9-10% growth. The disclosed technology adds a unique capability to this industry. As the industry is moving towards cell sorting capabilities from "detection only" systems, image-based cell sorting is a big leap for the system's capabilities and will open up countless opportunities of applications.

The disclosed technology provides image-guided cell sorting techniques, which enable: (1) real-time acquisition of fast travelling cell images using a beam scanning device such as an Acousto-Optic Deflector (AOD) beam scanner, (2) "gating" method based on both fluorescent signals and cell image features, (3) real-time image processing to produce image features of the objects and to compare these features against image-related gating criteria to determine whether to sort each cell flowing in the channel. In some implementations, the image-guided cell sorter is based on 2D images. Other implementations are also possible. Different from conventional cell sorters that are entirely based on fluorescent signals of biomarkers and/or light scattering intensities, the image-guided cell sorter suggested in this patent document enables real-time cell classification and sorting based on high-content cell images. Such imaging features include cell size, nucleus size, cell roughness, protein localization, etc. Exemplary applications include isolation of cells based on organelle translocation, cell cycle, detection and counting of phagocytosed particles, protein co-localization, and counting of irradiation induced DNA breakage, etc. The design of the image-guided cell sorting system suggested in this patent document can support a throughput of over 1000 cell/s, which is several orders of magnitude greater than any microscopy-based cell isolation systems such as laser micro dissection systems.

Overview of System

FIG. 1 shows a diagram of an example embodiment of an image-guided cell sorting system 100 in accordance with the present technology. The system 100 includes a cell imaging system 120, a data processing and control unit 130 in communication with the cell imaging system 120, and a cell sorting unit 140 in communication with the data processing and control unit 130. The system 100 is user-programmable to sort each particle based on user-defined criteria that can be associated with one or more of a plurality of properties exhibited by each individual particle analyzed in real time by the data processing and control unit 130. Some example user-defined criteria include, but are not limited to, an amount and/or size of sub-features of or on the individual particle (e.g., sub-particles attached to living cells, including particles engulfed by cells or attached to cells); morphology of the individual particle; and/or size of the individual particle. In this manner, the system 100 is able to evaluate and sort particles by properties, such as properties of living cells, including sorting by cellular physiological functionalities (e.g., particle or substance uptake by a cell, or particle engulfment by a cell), by cell damage, by localization of proteins, or by other cellular properties.

Figure 2A:
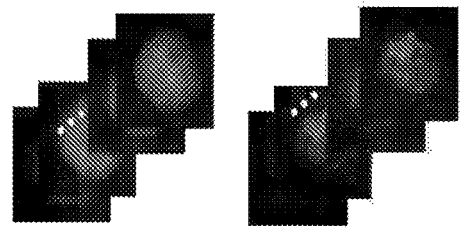
FIGS. 2A to 2E show a schematic overview of an exemplary working flow of an image-guided cell sorting system based on some implementations of the disclosed technology.
Figure 2B:
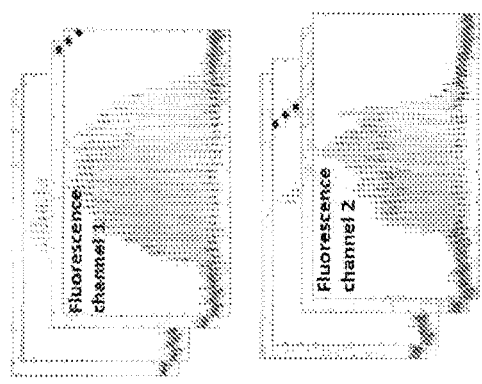
Figure 2C:
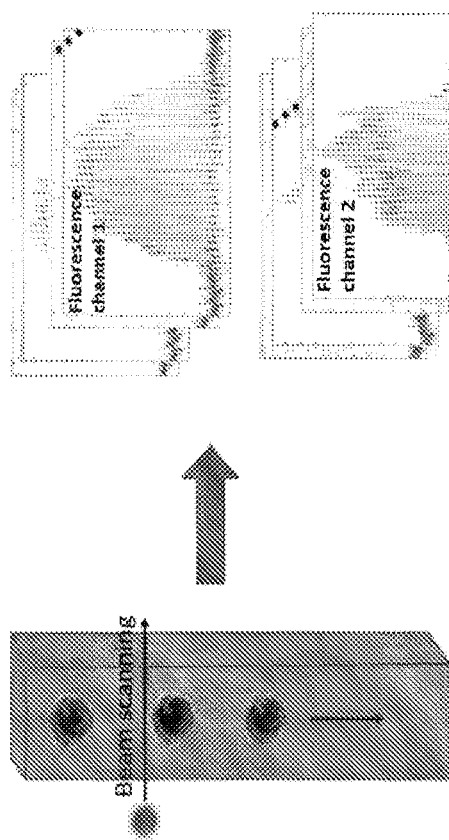
Figure 2D:
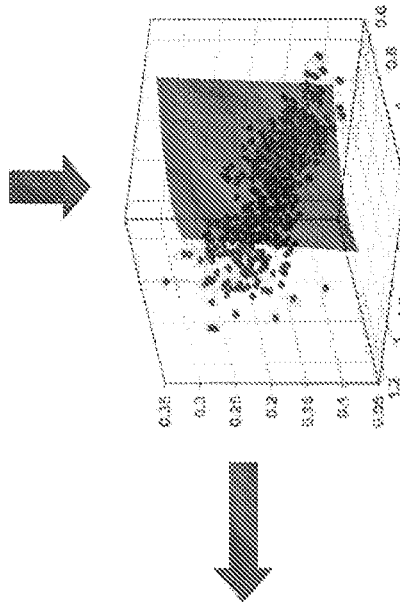
Figure 2E:
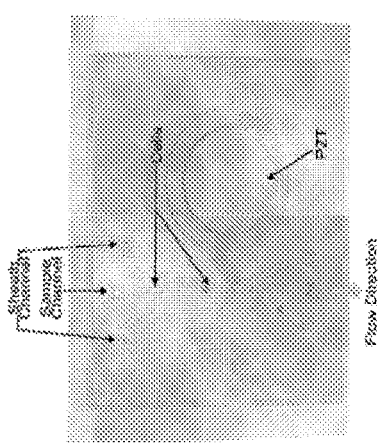

FIGS. 2A to 2E show a schematic overview of an exemplary working flow of an image-guided cell sorting system based on an implementation of the disclosed technology. The operations performed by the image-guided cell sorting system includes (1) scanning across each travelling cell with a laser beam to capture the cell image information into temporal waveforms as shown in FIG. 2A, (2) detecting waveforms based on the captured cell images as shown in FIG. 2B, (3) reconstructing cell images to generate reconstructed cell images as shown in FIG. 2C, (4) extracting imaging features and generating gating criteria as shown in FIG. 2D, and (5) real-time image-guided sorting as shown in FIG. 2E. The operations (1) and (2), i.e., capturing cell images and detecting waveforms from the captured cell images may be performed by the cell imaging system 120. Operations (3) and (4), i.e., reconstructing the cell images and extracting cell image features and generating criteria, may be performed by the data processing and control unit 130. The operation (5), i.e., real-time image-guided sorting, may be performed by the cell sorting unit 140. As cells flow through the microfluidic channel, each cell image is converted to a temporal waveform produced by the fluorescent or scattering/transmission signal resulted from the scanning laser excitation beam. The temporal fluorescent or optical scattering/transmission waveforms are detected by, for example, photomultiplier tubes (PMTs) or avalanche photodetectors (APDs), to become electronic waveforms. These electronic waveforms will then be reconstructed. The features of the reconstructed cell images are extracted and available to users to allow users to define or modify the gating criteria for cell isolation. The imaging features of each cell passing the interrogation area are calculated in real time and those cells with features meeting the sorting criteria (i.e. within the regime of defined gating) will be sorted.

Figure 3:
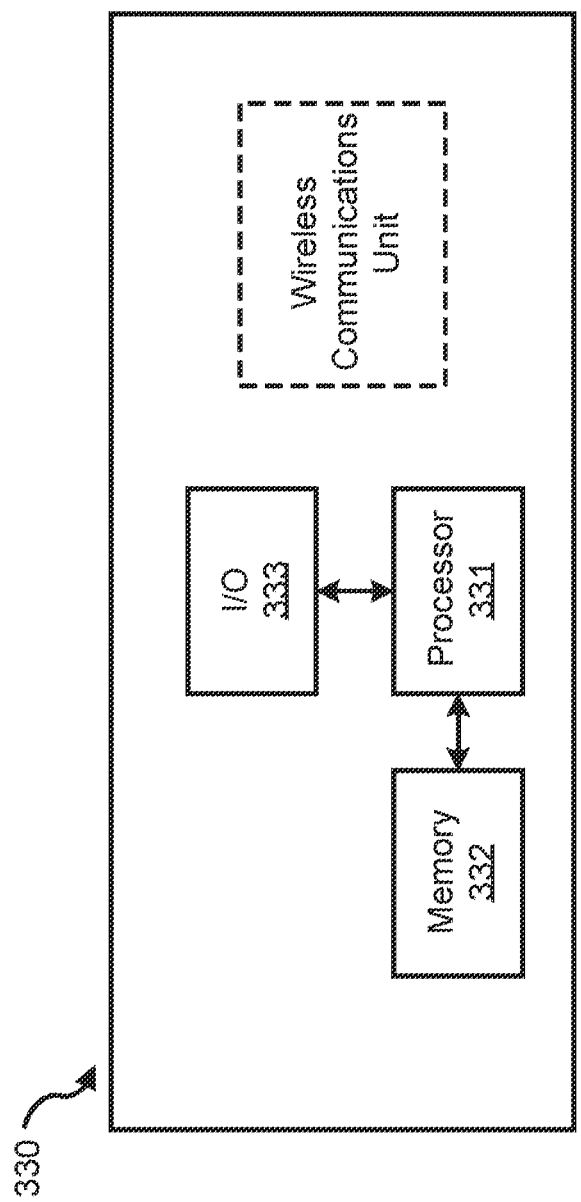
FIG. 3 shows a block diagram of an example embodiment of a data processing and control unit included in an image-guided cell sorting system based on some implementations of the disclosed technology.

FIG. 3 shows a block diagram of an example embodiment of the data processing and control unit 130. In various implementations, the data processing and control unit 130 is embodied on one or more personal computing devices, e.g., including a desktop or laptop computer, one or more computing devices in a computer system or communication network accessible via the Internet (referred to as "the cloud") including servers and/or databases in the cloud, and/or one or more mobile computing devices, such as a smartphone, tablet, or wearable computer device including a smart watch or smart glasses. The data processing and control unit 130 includes a processor 331 to process data, and memory 332 in communication with the processor 331 to store and/or buffer data. For example, the processor 331 can include a central processing unit (CPU) or a microcontroller unit (MCU). In some implementations, the process 331 can include a field-programmable gate-array (FPGA) or a graphics processing unit (GPU). For example, the memory 332 can include and store processor-executable code, which when executed by the processor 331, configures the data processing and control unit 130 to perform various operations, e.g., receiving information, commands, and/or data, processing information and data, such as from the cell imaging system 120, and transmitting or providing processed information/data to another device, such as the actuator.

To support various functions of the data processing and control unit 130, the memory 332 can store information and data, such as instructions, software, values, images, and other data processed or referenced by the processor 331. For example, various types of Random Access Memory (RAM) devices, Read Only Memory (ROM) devices, Flash Memory devices, and other suitable storage media can be used to implement storage functions of the memory 132. In some implementations, the data processing and control unit 130 includes an input/output (I/O) unit 333 to interface the processor 331 and/or memory 332 to other modules, units or devices. In some embodiments, such as for mobile computing devices, the data processing and control unit 130 includes a wireless communications unit, e.g., such as a transmitter (Tx) or a transmitter/receiver (Tx/Rx) unit. For example, in such embodiments, the I/O unit 333 can interface the processor 331 and memory 332 with the wireless communications unit, e.g., to utilize various types of wireless interfaces compatible with typical data communication standards, which can be used in communications of the data processing and control unit 130 with other devices, e.g., such as between the one or more computers in the cloud and the user device. The data communication standards include, but are not limited to, Bluetooth, Bluetooth low energy (BLE), Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, and parallel interfaces.

In some implementations, the data processing and control unit 130 can interface with other devices using a wired connection via the I/O unit 333. The data processing and control unit 130 can also interface with other external interfaces, sources of data storage, and/or visual or audio display devices, etc. to retrieve and transfer data and information that can be processed by the processor 331, stored in the memory 332, or exhibited on an output unit of a display device or an external device. Although FIG. 1 shows the single data processing and control unit 130, the disclosed technology is not limited thereto. Thus, in some implementations, the image-guided cell sorting system 100 can include multiple data processing units and control units, each performing the respective operations, e.g., detecting the waveforms, reconstructing the cell images, and extracting cell image features and generating criteria. If the image-guided cell sorting system 100 includes multiple data processing units and control units, those multiple units can be located at one site or distributed across multiple sites and interconnected by a communication network.

The operations (1) to (5) performed by the image-guided cell sorting system 100 will be further described in detail in the following respective sections.

Optical Configuration (Cell Imaging Operation)

Figure 4:
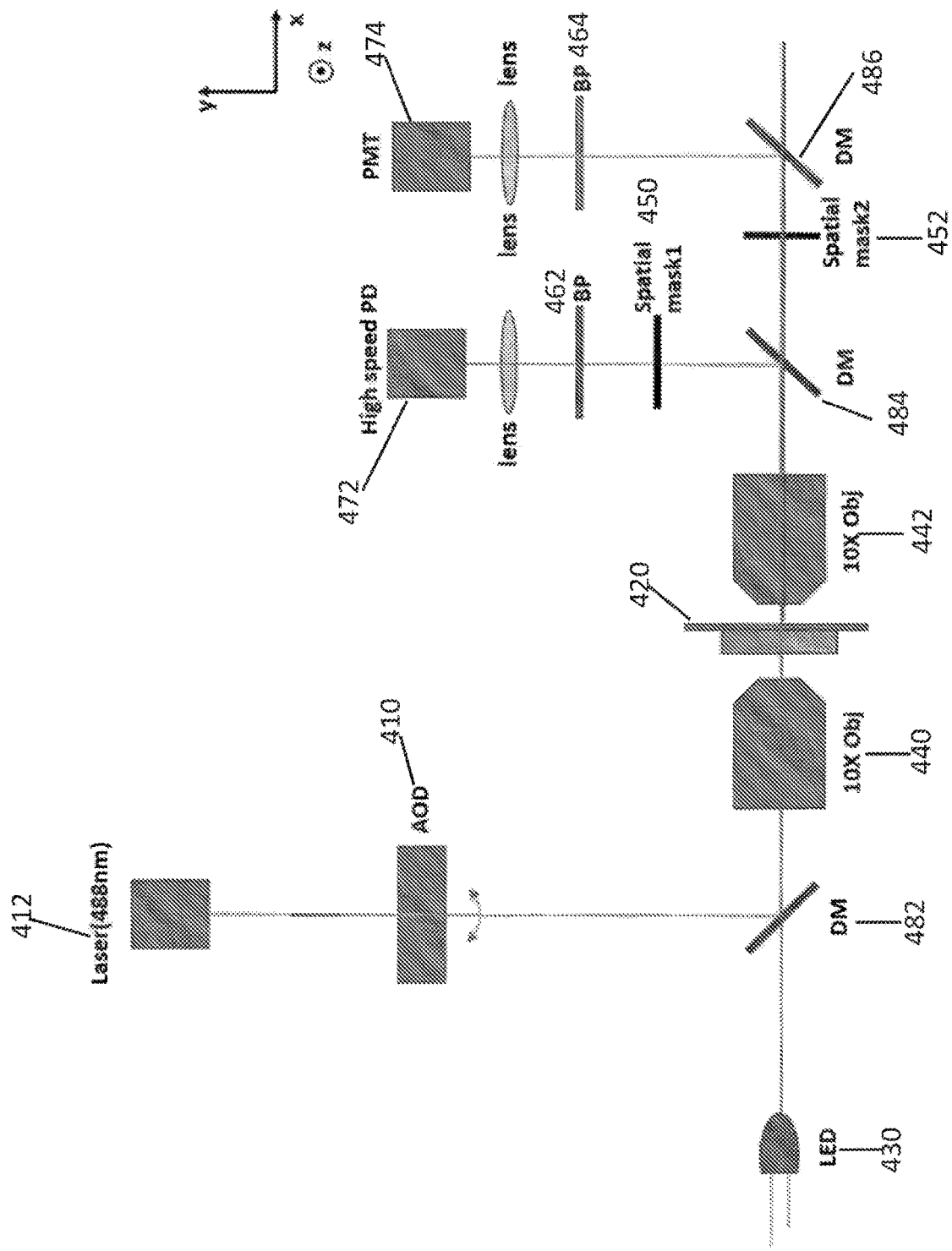
FIG. 4 shows an example of a schematic diagram of an optical configuration of an image-guided cell sorting system based on some implementations of the disclosed technology.

FIG. 4 shows an example optical configuration of a cell imaging system included in an image-guided cell sorting system based on some implementations of the disclosed technology. The optical configuration of the cell imaging system includes an AOD 410 and a laser lighting source 412 that are configured to input or probe light toward the particles (e.g., cells) flowing in a channel. The AOD 410 may be coupled to the laser lighting source 412 to deflect a laser beam. The laser lighting source 412 coupled with the AOD 410 may create a scanning beam with a small (<1 um diameter) spot size after focusing to provide an input or probe light at the illumination area of the microfluidic device, and to obtain images of the illuminated particles in the illumination area. Thus, the laser lighting source 412 and the AOD 410 operate together for the generation of fluorescent signals and/or optical transmission signal. In some implementations, the laser lighting source 412 and the AOD 410 operate to generate the fluorescent signals, or the optical transmission signals, or both of the fluorescent signals and the optical transmission signals. When the beam scans against the particles, the fluorescent signals can be detected, which includes cell fluorescent information. In addition, when the beam hits the cell, a part of the light is scattered and the remaining part transmits through, and the transmitted light can form the optical transmission signals including transmission image information. The scanned laser beam spot that excites fluorescence or transmits through can produce a time domain signal at the output of PMT 474 in the form of current or voltage. In some implementations, the laser lighting source 412 may be a 488 nm wavelength laser. The 488 nm wavelength laser illumination can be used to generate transmission images and fluorescence images via excitation of fluorophores. The laser illumination is focused to a diffraction-limited light spot by the objective lens on the left side of the sample.

Figure 5:
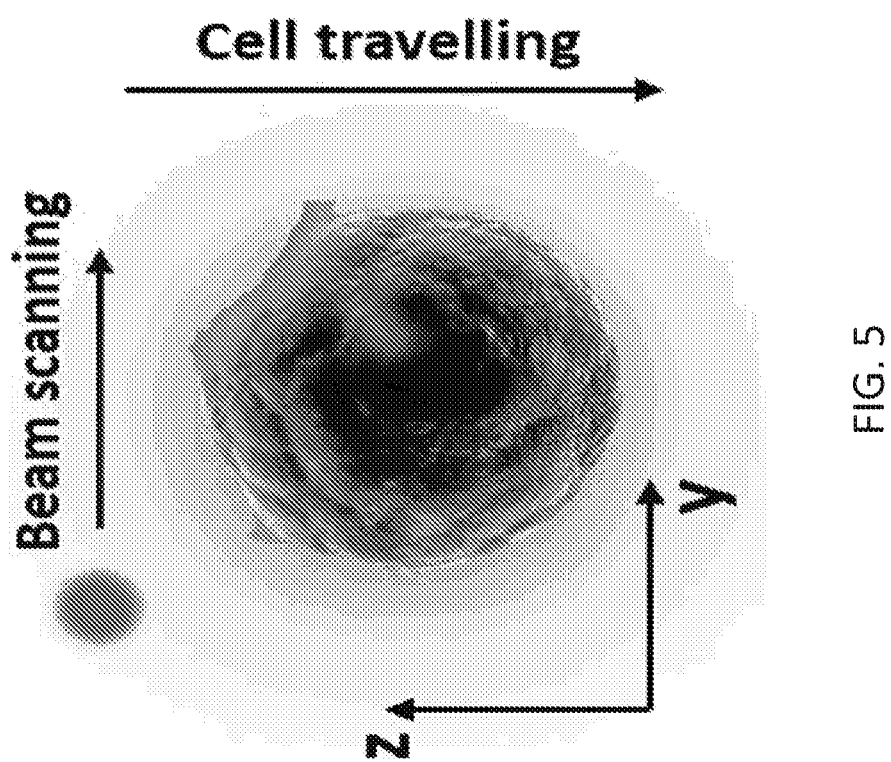
FIG. 5 shows examples of a beam scanning direction and a cell travelling direction that are employed in a cell imaging system based on some implementations of the disclosed technology.

FIG. 5 shows examples of a beam scanning direction and a cell travelling direction that are employed in a cell imaging system included in an image-guided cell sorting system based on some implementations of the disclosed technology. The flow direction of the cells is along the z-axis and the beam scanning proceeds in the y-axis. As shown in FIG. 5, the laser spot is scanned in the y-direction driven by the AOD 410, while the cell flows through the channel. The flow of the cell provides a slow-axis (z-axis) information and the beam scanning provides a fast-axis (e.g., y-axis) information, which enables the production of two-dimensional cell images over the y-z plane where y-axis is the beam scanning direction and z-axis is the cell flow direction. Since the AOD 410 performs only one-dimensional scanning, it is possible to create an image at a quite high speed. Although FIG. 4 shows the AOD 410 as the beam scanning element, other high-speed laser scanners can be used to scan the focal spots instead of the AOD 410.

In some implementations, besides the laser beam used for producing cell images, the image-guided cell sorting system also has an LED light source 430. Each flowing cell is illuminated simultaneously by, for example, a 455 nm wavelength LED provided by the LED light source 430. The LED light source 430 may be configured to measure the travel speed of each individual cell. As will be explained later, knowing the cell speed can be beneficial to reconstruct the cell images without distortions. Thus, the 455 nm LED may be used to measure the travelling speed of each cell and such information, i.e., travelling speed of each cell, will be utilized for cell image construction.

Figure 6:
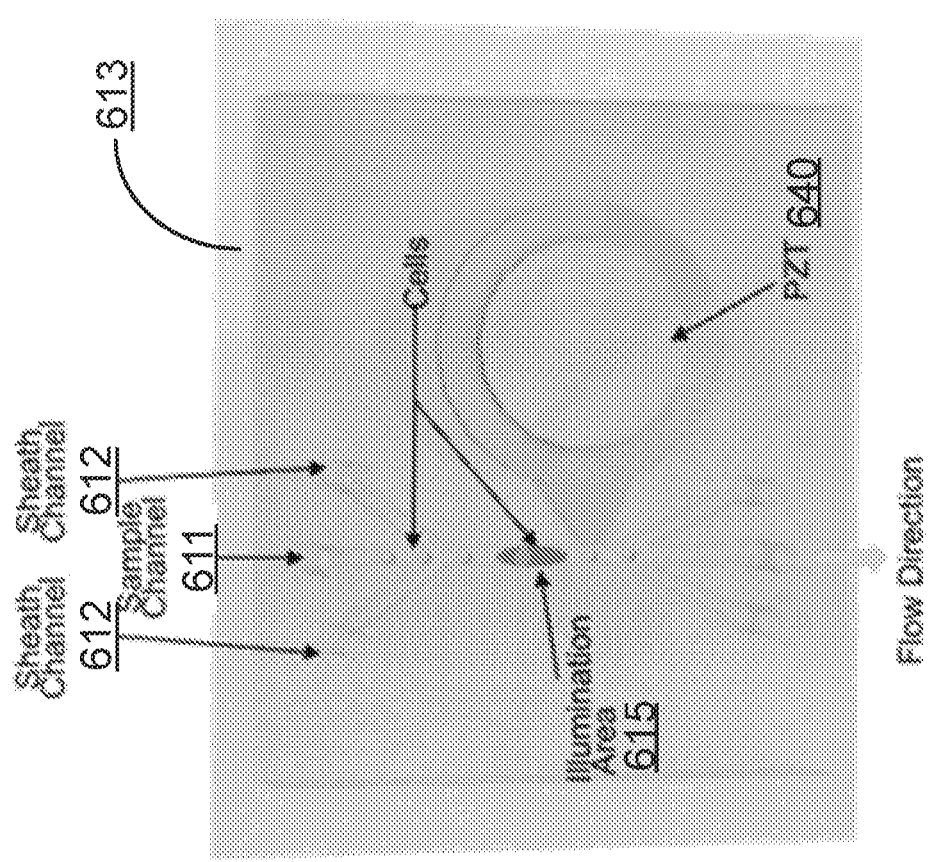
FIG. 6 shows an example of a microfluidic device included in an image-guided cell sorting system based on some implementations of the disclosed technology.

In some implementations, a microfluidic chip 420 may be employed, which is configured with an on-chip piezoelectric PZT actuator 640 to deflect selected cells in the microfluidic channel. FIG. 6 shows an example structure of the microfluidic chip. Referring to FIG. 6, the microfluidic chip 410 is structured to include a substrate 613 having a passage forming a microfluidic sample channel 611, and microfluidic sheath channels 612 that converge upon the sample channel 611. In some implementations, for example, the sample channel is configured to carry particles (e.g., cells) suspended in a fluid that flows in a flow direction, and the sheath channels 612 are configured to provide sheath flow of fluid to hydrodynamically focus the suspended particles in the fluid prior to flowing through an illumination area 615 of the microfluidic chip 420. In some embodiments, for example, the substrate 613 can be formed in a bulk material, e.g., such as polydimethylsiloxane (PDMS), that is bonded to a base substrate, e.g., a glass base substrate or base substrate of other material.

In this example as shown in FIG. 4, the image-guided cell sorting system further includes at least one of objective lenses 440 and 442 (e.g., of a microscope or other optical imaging device), light guide elements, first and second spatial masks 450 and 452, bandpass filters 462 and 464, a high-speed photodetector 472, or a photomultiplier tube (PMT) 474. In some implementations, the objective lenses 440 and 442 may be structured for both laser illumination and imaging to obtain high depth of focus across the cell thickness. In some implementations, the optical configuration of the image-guided cell sorting system includes one or more light guide elements, e.g., dichroic mirror, for various purposes. For example, the dichroic mirror 482 arranged with the laser light source 412 and/or the LED light source 430 is configured to direct the input light at the illumination area of the microfluidic chip 420. Dichroic mirrors 484 and 486 are used to route the desired emission bands to the high-speed photodetector 472 and the PMT 474. The field of view is determined by the scanning range of AOD 410 and the signal recording time period. In the optical setup, the field of view can be chosen to be, for example, 20 μm by 20 μm, which covers the size of most biological cells. The resolution is determined by diffraction limit of the objective lens. In this setup, the resolution is 1 μm.

Figure 7:
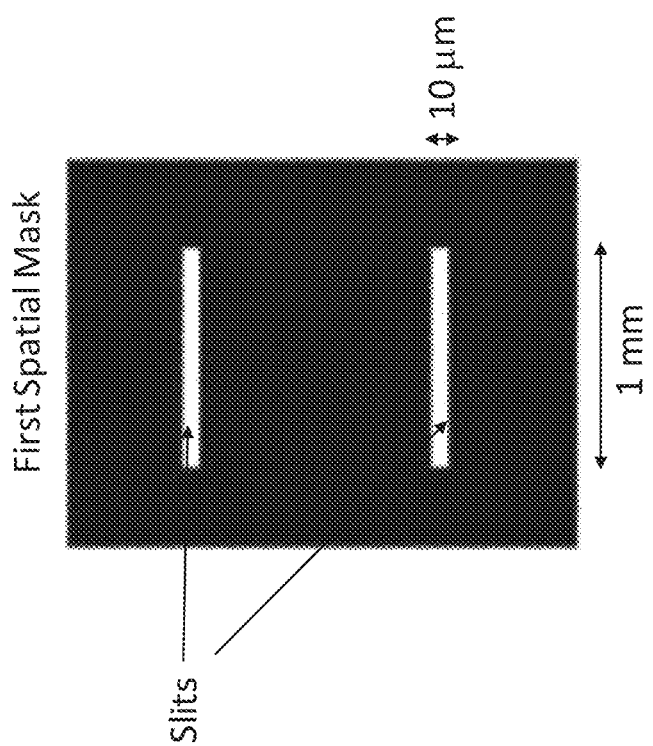
FIG. 7 shows an example design of a first spatial mask included in an image-guided cell sorting system based on some implementations of the disclosed technology.

In the example of FIG. 4, the LED light from the LED light source 430 passes the sample in the channel and the objective lens 442 and then is reflected by the first dichroic mirror 484 and transmits through the first spatial mask 450 before reaching the high-speed photodetector (PD) 472 to produce a photocurrent. FIG. 7 shows an example design of a first spatial mask. The first spatial mask 450 is structured to include two slits separated in the z-direction (i.e. cell flow direction) and is positioned at the image plane. Due to light scattering or absorption, the transmitted LED light through the slit produces a dip in the light intensity when a cell travels through the light path. The time interval between the two photocurrent dips produced by these two slits can be used to find the travel speed of the cell since the separation of the two slits and the magnification factor of the optical system are known. In the example as shown in FIG. 7, the two parallel slits on the first spatial mask 450 placed are 10 μm wide and 1 mm long each. The center-to-center distance between these two slits is 200 μm.

Figure 8:
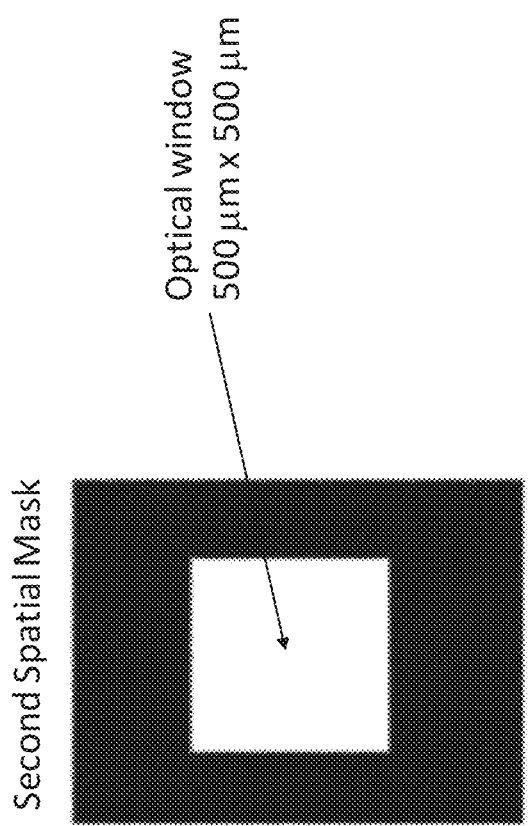
FIG. 8 shows an example design of a second spatial mast included in a cell imaging system based on some implementations of the disclosed technology.

At the image plane position for the laser beam, the second spatial mask 452 is further provided. FIG. 8 shows an example design of a second spatial mask included in a cell imaging system based on some implementations of the disclosed technology. In some implementations, the second spatial mask 452 may have a 500 μm by 500 μm optical window. The actual field-of-view at the image plane for the scanning laser is designed to be 200 μm by 200 μm, and thus the second spatial mask 452 can be treated as an optical window. The second spatial mask 452 is configured to block stray light to enhance the sensitivity of the overall system.

The PMT output signals are acquired and processed by a data processing and control unit 130 (e.g. a FPGA) to make the sorting decision. The number of PMTs included in the cell imaging system can be varied. For example, although FIG. 4 shows only one PMT, more PMTs can be added to the imaging system, and if necessary, more excitation laser beams can be added to produce cell images. In some implementations, the piezoelectric PZT actuator is actuated to sort cells based on the sorting decision.

Image Construction

The data processing and control system 130 of the image-guided cell sorting system 100 is configured in communication with the cell imaging system 120, e.g., via the PMT, to rapidly process the imaged particles and produce a sorting control based on the processed image of each particle imaged in real-time. In some implementations of the data processing and control system 130, a FPGA processing unit is configured to rapidly process the image signal data received by the cell-imaging system.

Image construction process contains three steps: (1) conversion of the temporal waveform of PMT into an uncorrected 2D cell image, (2) correction of effect caused by a time delay between the modulating voltage applied to the AOD and the corresponding laser beam spot, which is referred to the correction of "phase shift" below, and (3) correction of image distortion due to the effect of cell travelling speed, which is referred to as "image resizing" as errors in cell speed measurements can result in contraction or stretch of the cell image. In the following, each step is discussed in more detail.

(1) Conversion of the Temporal Waveform of PMT Output into an Initial 2D Cell Image.

The data processing and control system 130 receives the PMT output signals which are temporal waveform including cell image information and converts the temporal waveform into the initial 2D cell image. To convert the temporal waveform to the initial 2D cell image, the data processing and control system 1300 performs the data processing including normalization of the PMT output signal. FIG. 9A shows an example of voltage waveform that modules AOD ('AOD signal'). FIG. 9B shows an example process for finding troughs and peaks of the AOD signal. As shown in FIG. 9A, the troughs and peaks of the voltage waveform that modulates the AOD are firstly found, and then the waveform plot is normalized to set the peak to be 1 and trough to be zero. FIG. 9C shows an example of a normalized cell signal. The waveform that modulates the AOD rises linearly with time from trough to peak and drops rapidly from peak to trough. Such waveform continues over time to form a periodic sawtooth waveform. Within each sawtooth period, the AOD scans the laser spot from one extreme position to another at a uniform speed along the y-axis, and then the laser spot returns quickly back to the starting position for the next scan. In the current design, a liner scan is chosen considering the simplicity of computation and the properties of acoustic optic crystal. Scanning waveforms other than the sawtooth waveform can also be used. Each time the AOD scans the laser excitation beam spot in the y direction, the resulting fluorescent or transmission signal detected by the PMT forms a 1D slice of the cell image along the y direction. Since the cell is also travelling in the z-direction during laser scanning, the laser y-scanning actually produces a line scan of the cell image with a small angle with respect to the frame of the cell. The small angle can be defined as follows:

$$\left(\theta \sim \frac{v_{cell}}{v_{scan}}; v_{cell}: \text{cell flow speed}, v_{scan}: \text{laser beam scanning speed}\right)$$

Due to the much faster laser beam scanning speed compared to the cell traveling speed (e.g. 500 cm/s for $v_{scan}$ and 20 cm/s for $v_{scan}$), such effect is rather small and can be neglected or easily corrected, if needed. Ignoring the small angle between the y-axis for the laboratory frame and the cell frame, one can consider that each time the laser beam makes a line scan along the y-axis, the cell image features in the y-axis are recorded at a new z-position. Mathematically, each cell travelling through the optical illumination area will produces a series of image data registered as $S^{z1}(y_1), S^{z1}(y_2) \ldots S^{z1}(y_N); S^{z2}(y_1), S^{z2}(y_2) \ldots S^{z2}(y_N); \ldots S^{zM}(y_1), S^{zM}(y_2) \ldots S^{zM}(y_N)$. The above data set can be arranged into an M×N matrix, representing an initial 2D cell image in the y-z plane.

(2) Phase-Shift Correction of Initial 2D Cell Image

Figures 10A, 10B:
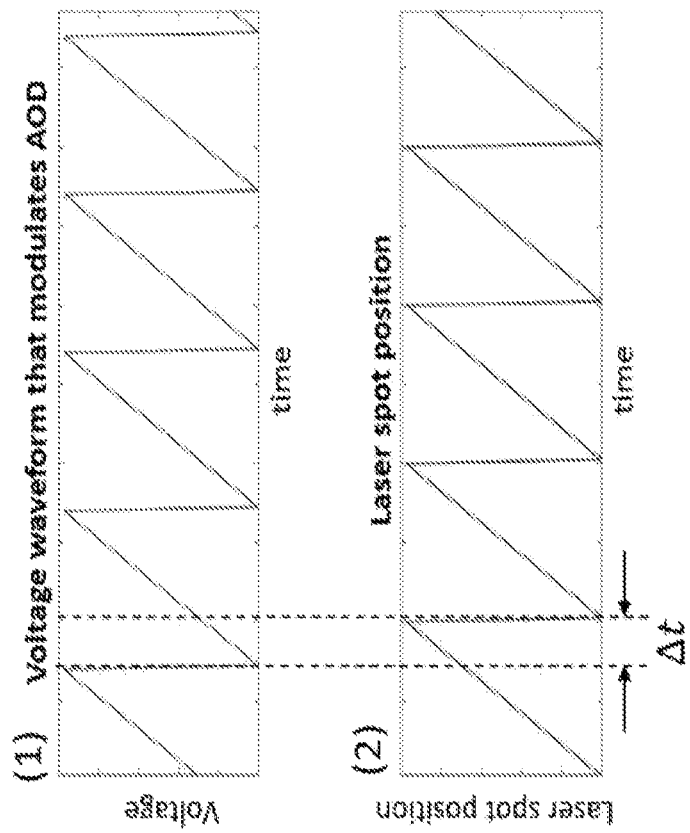
FIGS. 10A and 10B illustrate a time delay between a modulating voltage applied to an AOD and a corresponding beam spot.

The data processing and control system 130 performs a phase-shift correction on the initial 2D cell image. As briefly mentioned above, the phase-shift correction is to correct effects caused by time delay between the modulating voltage applied to the AOD and the corresponding laser beam spot. Under DC bias condition, the laser beam spot needs to match the applied voltage to the AOD, having the beam spot at one extreme position in y-axis at the minimum bias voltage and the opposite extreme position at the maximum bias voltage. However, when a sawtooth voltage waveform is applied to the AOD, there can be a time delay between the actual laser beam spot position and the voltage value due to the electric capacitance of the AOD and parasitic capacitance. FIGS. 10A and 10B show an illustration of a time delay occurring between the modulating voltage applied to the AOD and the corresponding laser beam spot. FIG. 10A shows the voltage waveform that modulates AOD, and FIG. 10B shows the actual laser beam position. As shown in FIGS. 10A and 10B, there is a time delay $\Delta t$, which is referred to as a "phase shift." FIGS. 11A-11C illustrate examples of a voltage waveform of an AOD signal, a normalized cell signal, and a corresponding 2D image before a phase-shift conversion is performed. The cell image as shown in FIG. 1 IC corresponds to the one slice of the image based on each rising edge and the corresponding PMT detected signal. The images are spliced to reconstruct the 2D cell image.

Such phase shift will produce a 2D cell image similar to the one in FIG. 11C where the lower part of the cell appears to be atop the upper part of the cell, partly due to the phase shift discussed earlier and partly due to the asynchronization between the cell arrival time (i.e. the time when a cell enters the field of view) and the timing of laser scanning. The phase shift correction, which will be discussed below, is performed to correct both effects (i.e. phase shift due to AOD and asynchronization between cell arrival time and the timing of laser scanning).

Figure 12A:
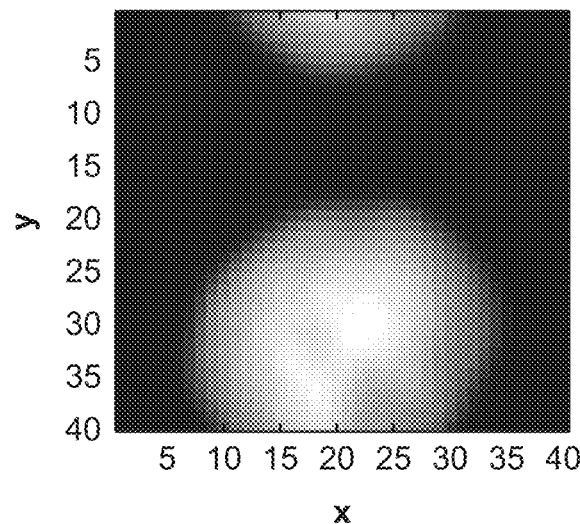
FIGS. 12A to 12D illustrate an example of a process of a phase-shift conversion based on some implementations of the disclosed technology.
Figure 12B:
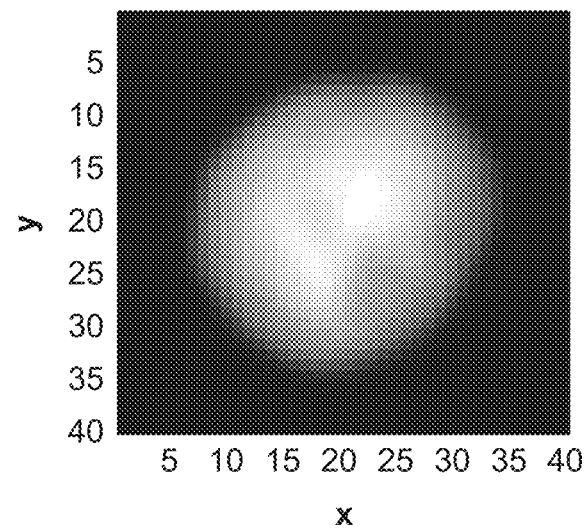
Figure 12C:
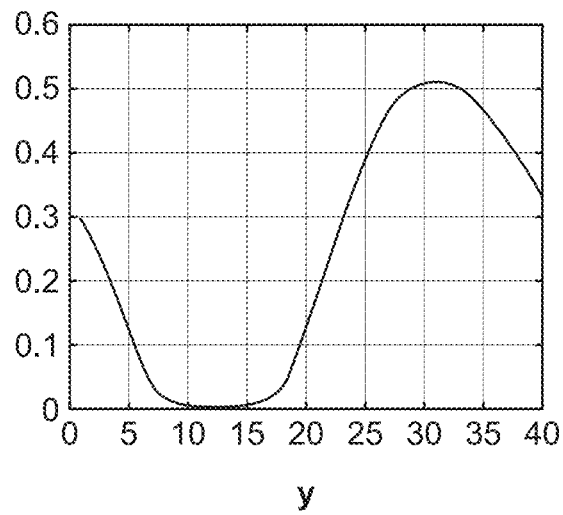
Figure 12D:
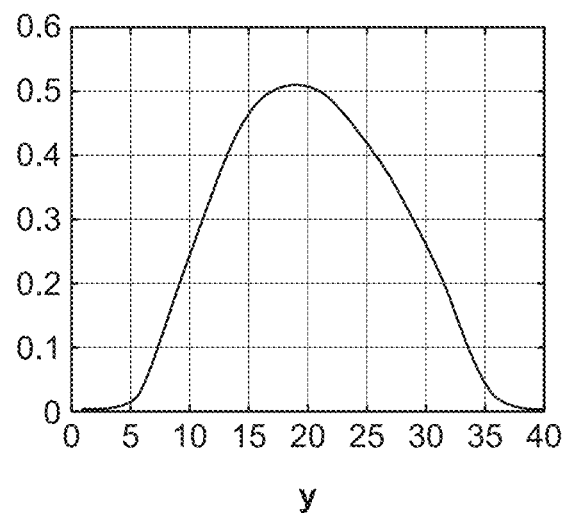

To correct the above effects, the image of transmitted signal is taken, which shows the contour of the cell in the y-z plane. FIG. 12A to 12D illustrate a process of a phase-shift conversion based on some implementations of the disclosed technology. FIG. 12A shows the initial 2D image before the phase shift correction, FIG. 12B shows the corrected 2D image after the phase shift correction, FIG. 12C shows a signal integration along x-axis before phase shift correction, and FIG. 12D shows a signal integration along x-axis after the phase shift correction. By choosing one or a few z-positions and plot the transmitted light intensity along the y-direction, i.e., the laser scanning direction, an intensity plot similar to FIG. 12C is obtained where the intensity profile does not appear to show a continuous profile but be divided into two regions separated by a section with minimum intensity. By shifting the leftmost region to join the right most region to make a continuous intensity profile and to center the entire intensity profile, the "phase-shift corrected image" shown in FIG. 12D can be obtained. The reconstructed image in FIG. 12D consists of 40 by 40 pixels with a pixel size of 0.5 um.

Note that although the phase shift is only corrected for the transmitted image, the same correction for the phase shift can be also applicable to the fluorescent signals and other scattering signals since they are all produced by the same scanning laser beam and synchronized with each other.

(3) Image Resizing to Correct Image Distortion

The data processing and control system 130 performs an image resizing operation to correct the image distortion due to effect of cell travelling speed. The image resizing operation corrects errors in cell speed measurements which result in contraction or stretch of the cell image. Even with flow confinement, cells will not be at the same position in the cross section of the flow channel. The actual cell positions in the flow channel depend on the cell size, cell stiffness, and the detailed design of the flow channel. For cells in a microfluidic channel with 2D instead of 3D flow confinement, the cell distance from the ceiling (or floor) of the channel can vary appreciably. In a laminal flow where cell speed is determined by the cell position within the channel, the above effects can produce appreciable speed variations among cells. The process of cell image construction converts a temporary signal (detected by PMTs) into a spatial signal. In making such conversion, cell travelling speed determines how a certain time period is transformed into a certain length in space, hence variations in cell speed can affect the length scale and thus distort the cell image.

In some implementations, it is considered that a cell moves at a speed v in the flow (z-) direction. For a time interval $\Delta t$ which is the time period of the sawtooth waveform, the laser spot scans through the y-axis and produces a train of signal: $S^{z_i}(y_1)$, $S^{z_i}(y_2)$ .... $S^{z_i}(y_N)$. For the next scan occurring in the next period of $\Delta t$, another train of signal: $S^{z_i}+1(y_1)$, $S^{z_i}+1(y_2)$ .... $S^{z_{i+1}}(y_N)$ is produced where $z_{i+1} = z_i + \Delta z = z_i + v\Delta t$ Assume an AOD operates at 400 KHz and each scan takes 2.5 µs (i.e. $\Delta t$=2.5 µs) and a cell travels at a speed of 20 cm/s, it is calculated that $\Delta z = v\Delta t = 0.5$ µm. Then the amount of time of taking 40 scans would cover a distance of $\Delta z \times 40 = 20$ µm, which defines the field of view along the flow direction (z-axis). However, if another cell travels through the optical interrogation area at a speed of 25 cm/s, $\Delta z = v\Delta t$ becomes 0.625 µm. Then over the same amount of time of taking 40 scans, the distance becomes 25 µm (0.625 µm×40=25 µm) along the z-direction. Effectively, the field of view along the z-axis increases with the cell travel speed. If the travel speed of individual cells is unknown and an average cell speed is taken to construct cell images, then cells travelling faster than the average speed will appear to be smaller along the z-axis than their actual size, and cells travelling at lower than the average speed will appear to be larger than their actual size. Therefore, the process of resizing is necessary to construct the cell image correctly without distortion.

From the above discussion, obviously one needs to know the travel speed of the cell, v, accurately to produce the correct cell image in the y-z plane. The transmitted LED light through the two slits on the first spatial mask as shown in FIG. 7 produces the signal that allows us to precisely measure the speed of each cell, and the knowledge of speed enables to put the proper length scale in the z-direction to construct the cell image without distortion.

Figure 13B:
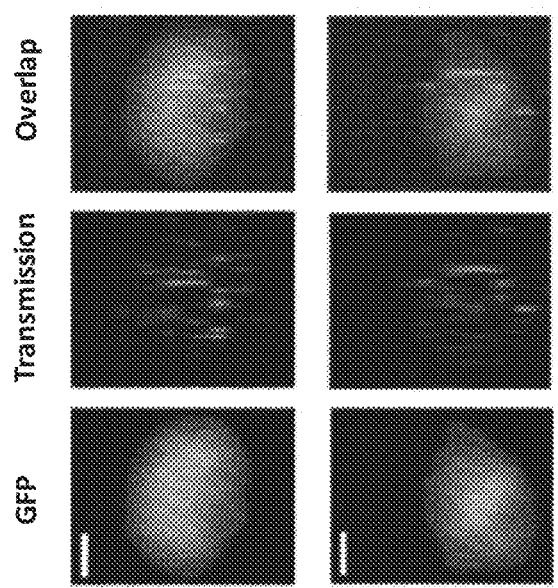
FIGS. 13A and 13B show examples of reconstructed cell images based on some implementations of the disclosed technology.
Figure 13A:
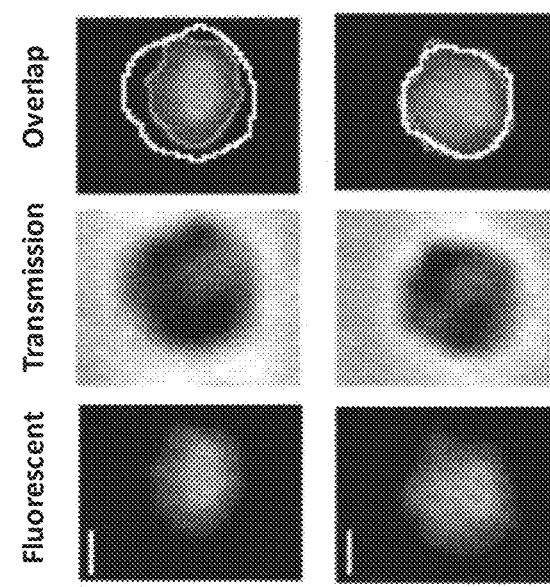

Some examples of reconstructed cell images are shown in FIGS. 13A and 13B. FIG. 13A shows the transmission and fluorescent images of pEGFP-GR plasmids translocated HEK-297T cells and un-translocated HEK-297T cells. The first row shows translocated cells, and the second row shows un-translocated cells. The first column shows fluorescent images, the second column shows transmission images, and the third column shows fluorescent images overlaid with transmission images with their respective contours defined by the computer-generated red and white curves, where the first, second, third are from the left to the right. The transmission images produce the contour of the cell and the fluorescent images show the localization of GR-GFP protein within cells. For the un-translocated cells, GR-GFP protein is dispersed in cytoplasm, but for translocated cells, GR-GFP protein is accumulated to nucleus. FIG. 13B shows the fluorescent images of GFP transfected human glioblastoma cells with DNA Double-strand Breaks (DSB) caused by radiation damage. The first column shows GFP images, the second column shows fragments of double strand DNAs broken by radiation, and the third column shows overlaid images, where the first, second, third are from the left to the right. The green fluorescent images delineate the area of the entire cell and the red fluorescence images represent the fragments of double strand DNAs broken by radiation.

Feature Extraction

While cell images provide intuitive and rich information through visualization, the information can be managed and utilized by extraction of key features from these images given the extremely large number of images (often well over 1 million cell images) produced in each experiment. Generally, the biologically and clinically relevant image features can be divided into two groups: the features from each individual parameter and features from correlations between two or more parameters. The commonly used features from each parameter includes area, perimeter, shape, major and minor axis length, circularity, concentricity, aspect ratio (major axis length/minor axis length), integrated intensity, mean intensity (intensity divided by area), standard variation of intensity over space, granularity, texture entropy, texture variance, spot count, etc. For relations between two or more parameters, they include areas of overlap, correlations in intensity distribution, intensity variance, area, etc. In some implementations, the image features can include at least one of a number of illuminated particles, size of the illuminated particles, spatial distribution of the illumination of the input light, density of the illumination of the input light, darkness, or brightness. To perform image-guided cell sorting in a flow environment, it is required that (a) the image features of each cell passing the interrogation zone need to be computed in real time, typically in less than 1 ms and (b) one needs to properly define "gating" based on some image features as the criteria for cell sorting. In the following, the approaches of finding "gating" and real time computation of image features for each cell are discussed.

Gating Strategy

In general, one can take two approaches to define gating, one based on machine learning or deep learning, and another based on a methodology of user-interface (UI) and user-experience (UX) interaction. There have been many established machine learning and deep learning algorithms that can be tailored to the cell sorting application since here the image objects are distinct, relatively well defined, and standing out from the background. For supervised learning, training samples are flowed through the system and imaging signals are recorded and processed. Since no sorting takes places at this stage, the image signals can be processed off-line. The signal processing converts the recorded signals into cell images and extracts imaging features via computation algorithms. For image-guided cell sorting, users can define the gating criteria based on the image features of cells. The signals from each cell are acquired and processed in real time to allow sorting based on the comparison result of the cell image features against the defined criteria (gating). Here, the approach involving machine/user interactions is discussed as an exemplary embodiment from the user perspective. The operation procedures are outlined in FIGS. 14A-14D which show the flow chart of gating strategy.

Figure 14A:
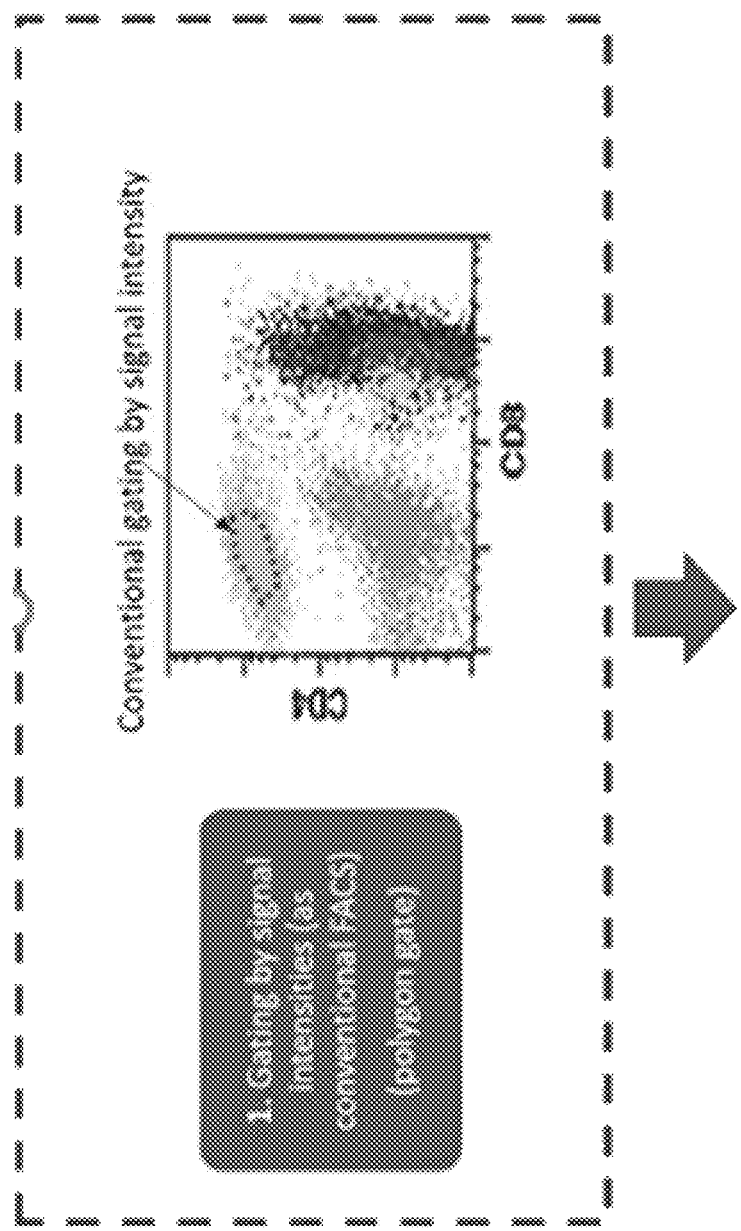
FIGS. 14A to 14D show an exemplary flow of a gating strategy based on some implementations of the disclosed technology.
Figure 14B:
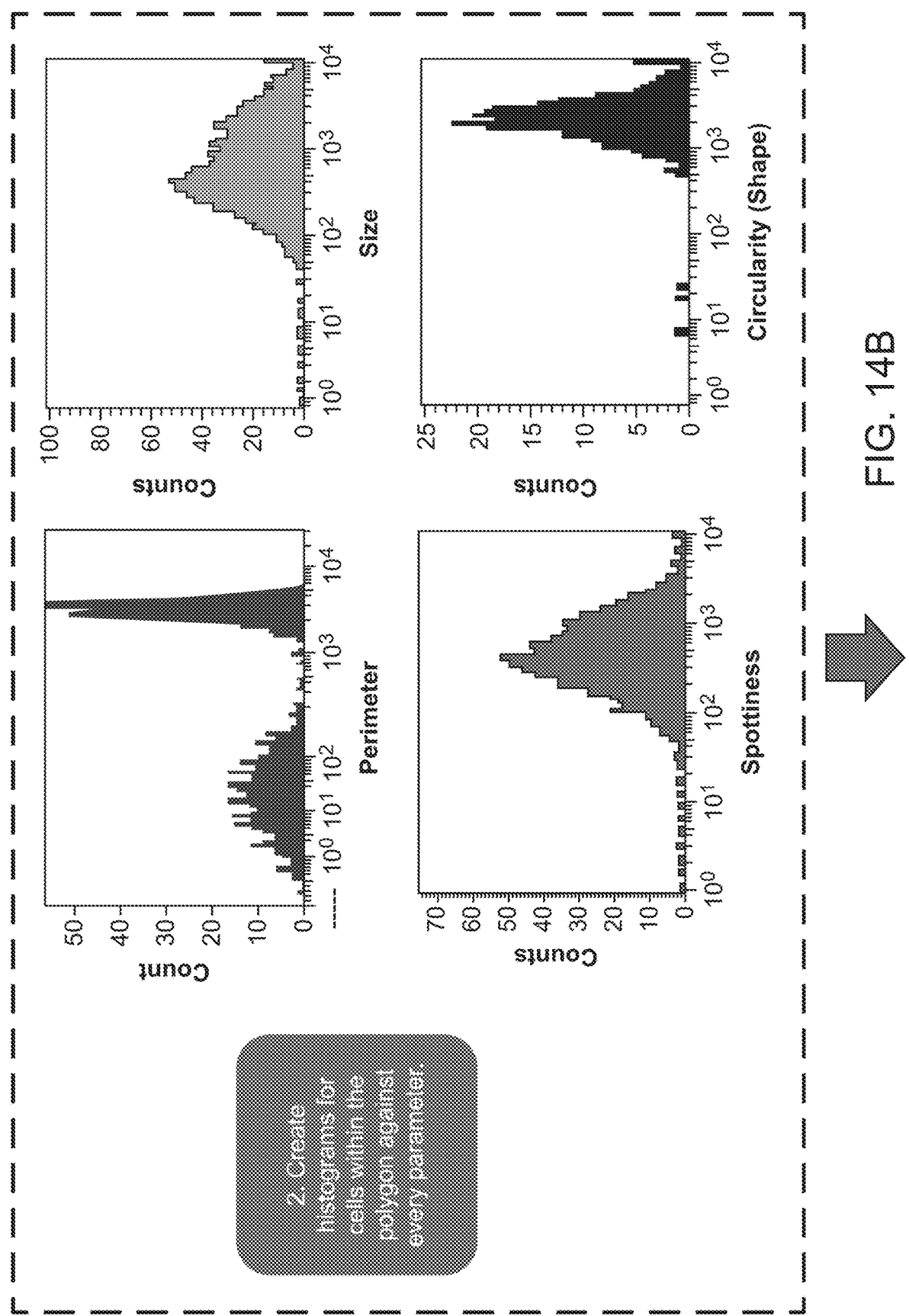
Figure 14C:
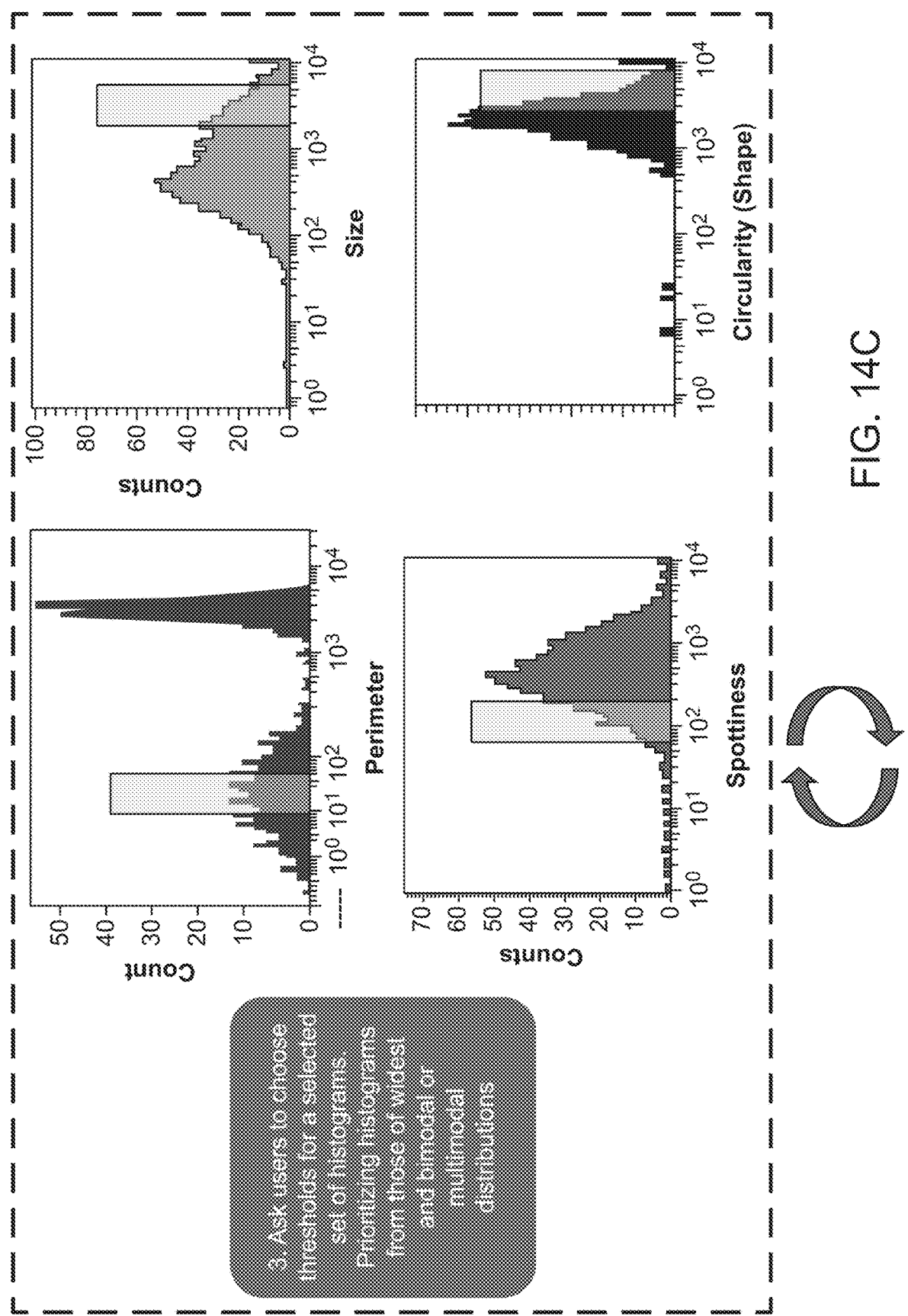
Figure 14D:
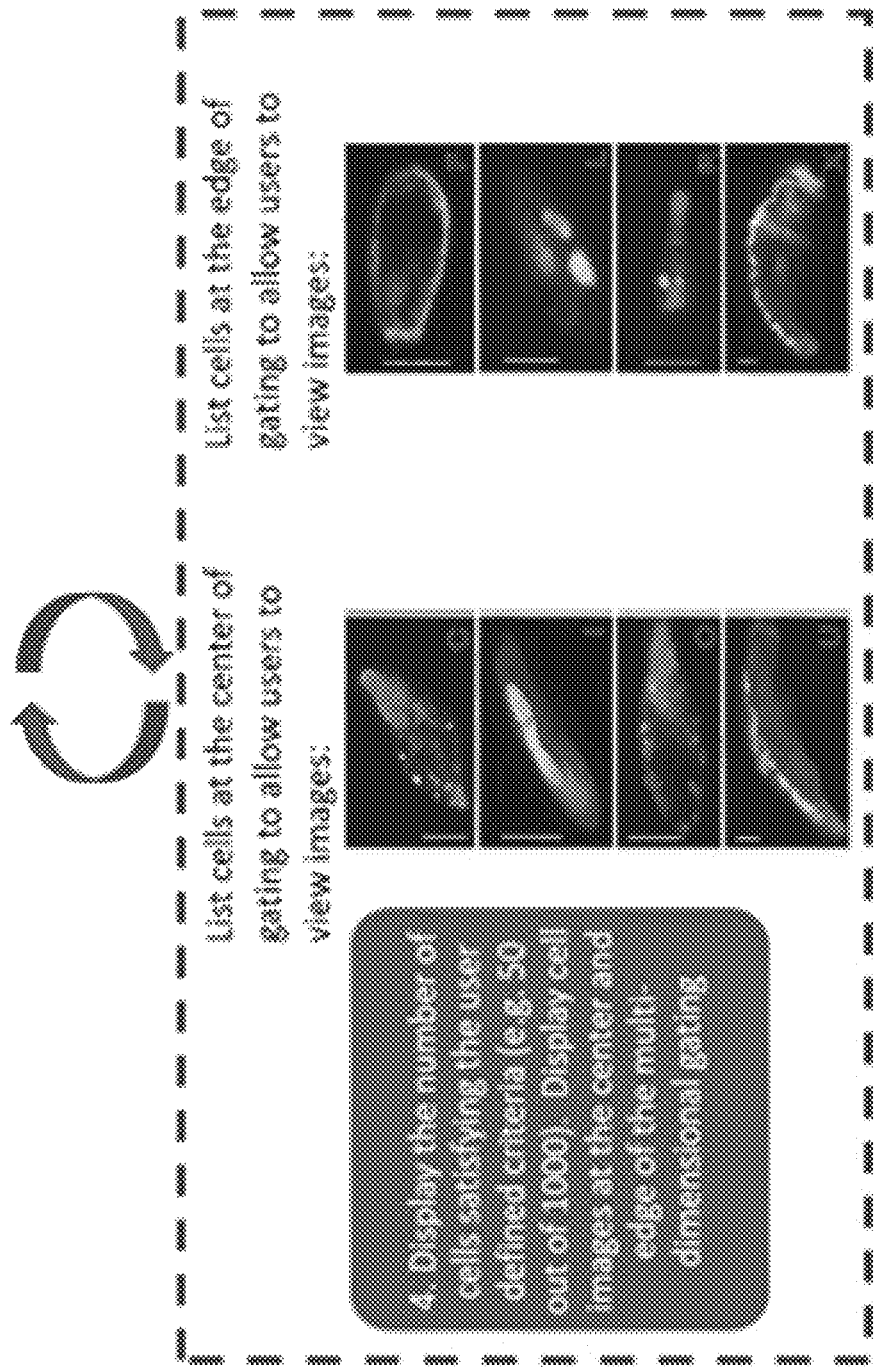

As shown in FIG. 14A, a user can first select the interested population based on signal intensities. In some implementations, the method of selecting the interested population based on signal intensities can be similar to the operation of conventional flow cytometers and familiar to all flow cytometer users. Second, as shown in FIG. 14B, the histograms for each image feature within the selected population are displayed. Users can go through these histograms of image features to decide which features are most relevant to the intended applications. From these histograms, as shown in FIG. 14C, users can easily and intuitively tell if the originally selected cell population can be further divided into subpopulations characterized by these image features (e.g. spatial distribution of the fluorescent intensity, shape or size of cells or organelles). Then users can refine the gate to select one or multiple subpopulations of cells according to a particular set of image features. As a result, cell sorting is guided not only by conventional fluorescent or scattering signals but also by image features.

In some implementations, users can have the choice to define the gating (cell sorting criteria) based on the image features. The image features may include a shape, size of cell body or nucleus, fluorescent patterns, fluorescent color distribution, etc. Users can draw the cells they wish to separate and the system will perform accordingly. With such unique capabilities, users such as researchers can track many important biological processes by localization of certain proteins within cytosolic, nuclear, or cell membrane domains and subdomains. Because every cell population has some degree of heterogeneity at a genomic (e.g., mutations, epigenetics) or environmental (e.g., asymmetric division, morphogen gradients) level, identification and extraction of single-cells according to their unique spatial features are envisioned to contribute significantly to the fields of immunology, tumor heterogeneity, stem cell differentiation, and analysis of neurons. In some implementations, users can perform the gating operation without starting with conventional optical fluorescent or scattering signals. This can be one optional mode of operation for label-free sorting of lymphocytes or CTCs where the cell and nucleus shape/size show distinctive characteristics and rich information compared to traditional forward and side scattering signals.

To assure the image-guided sorting criteria satisfy the user needs or consistent with the user knowledge about their samples, reconstructed cell images inside and outside the gated areas can be displayed, allowing users to check the actual images of cells they choose to sort or exclude. Users can repeat the steps shown in FIGS. 14C and 14D to fine tune the sorting criteria.

Real-Time Processing Module

Figure 15:
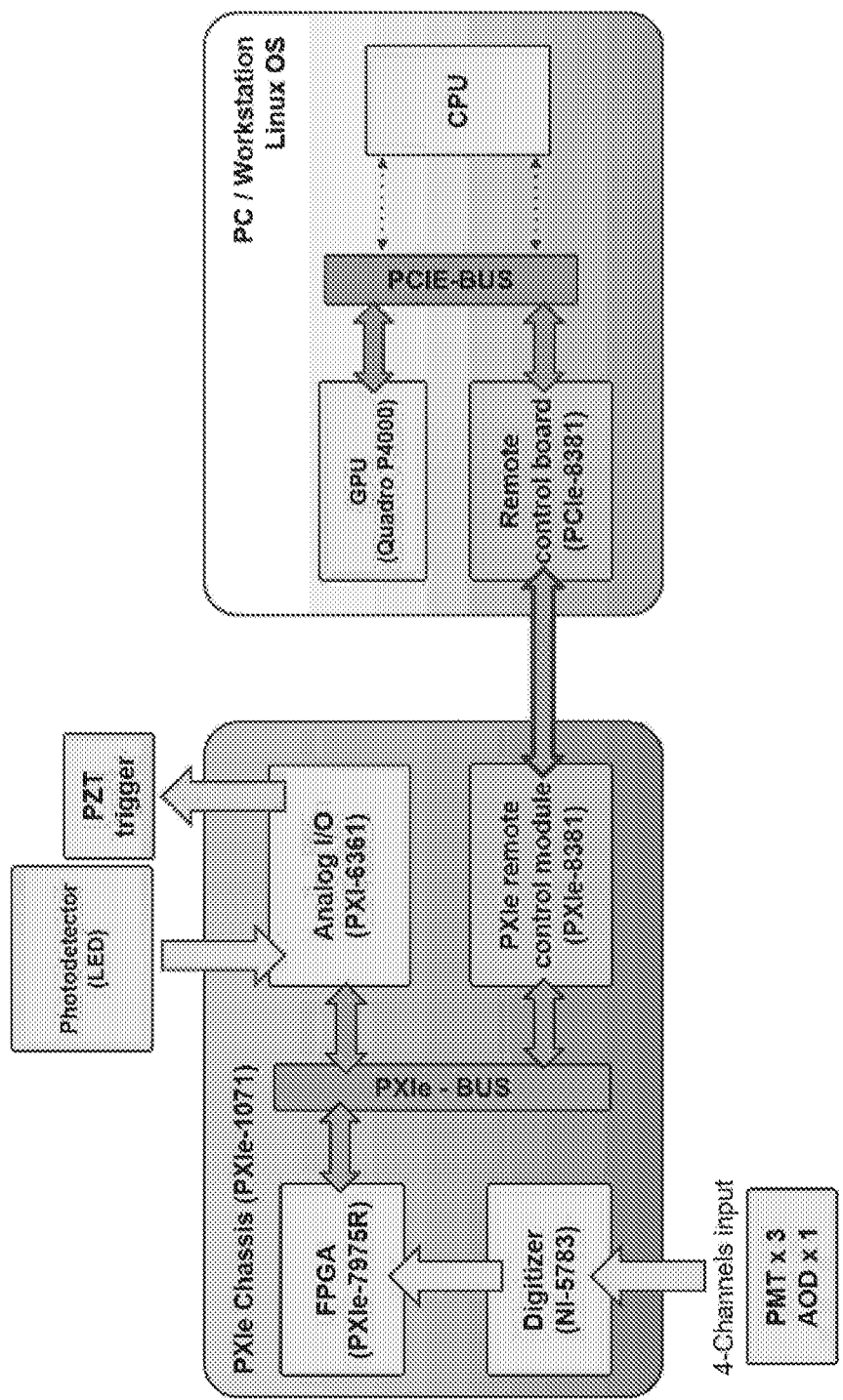
FIG. 15 shows an example of a schematic diagram of real-time processing module based on some implementations of the disclosed technology.

Sorting cells from a flow requires the abilities to compute the image features of each cell, compare these parameters against the sorting criteria, define gating, and activate the device to isolate the selected cells from the stream. These sorting processes need to be completed rapidly to achieve high throughput, which is typically 1000 cells/sec for flow cytometers. Therefore, real-time processing for computation of cell image features is needed. To accelerate processing speed, one preferred embodiment is a FPGA-GPU hybrid design. The diagram of real-time processing system is illustrated in FIG. 15 which shows a schematic diagram of real-time processing module. The PMT signals and the voltage signal modulating the AOD are acquired and digitized, and the LED signal from a photodetector is acquired by an Analog Input (AI) module. First, the FPGA reconstructs the cell images from the acquired signals. Then, the reconstructed cell images are transferred to the GPU for imaging feature extraction. After the image features are computed, the features are transferred back to the FPGA. Sorting decision is made based on the extracted imaging features compared against the defined sorting criteria.

In some implementations, the sorting criteria can change based on an input from a user. For example, the real-time processing module can be coupled to a device which allows a user to provide an input for the sorting criteria. The user may adjust current sorting criteria or add new criteria as necessary. When the initial analysis using, for example, biomarkers, shows some discrepancy with regard to some characteristics in cell images, the user device can provide the input to adjust the cell sorting criteria to remove the discrepancy. When the cell shows a strong biomarker with a different characteristic either by a shape or by a size, the user device can provide the input to add new sorting criteria to more easily isolate a particular group of cells including the different characteristic. In this manner, the real-time processing module can perform an interactive self-storing operation that can reflect the feedback from the users.

In some implementations, to sort a cell, a voltage pulse is applied to the on-chip piezoelectric PZT actuator, which instantaneously bends the bimorph PZT disk to deflect the cell away from the central flow into the sorting channel. The integrated piezoelectric actuator offers a desirable design to sort cells due to its low cost, easy operation, and gentleness that results in high cell viability, but other mechanisms, including electrophoresis, dielectrophoresis, electric static, mechanical, acoustic, optical tweezers, etc. can also be used to sort cells.

Although a hybrid signal processing module consisting of FPGA and GPU is desirable for high throughput and multiparameter systems, other designs using FPGA only, or FPGA and CPU of a PC can also be adopted based on cost and performance considerations.

Figure 16:
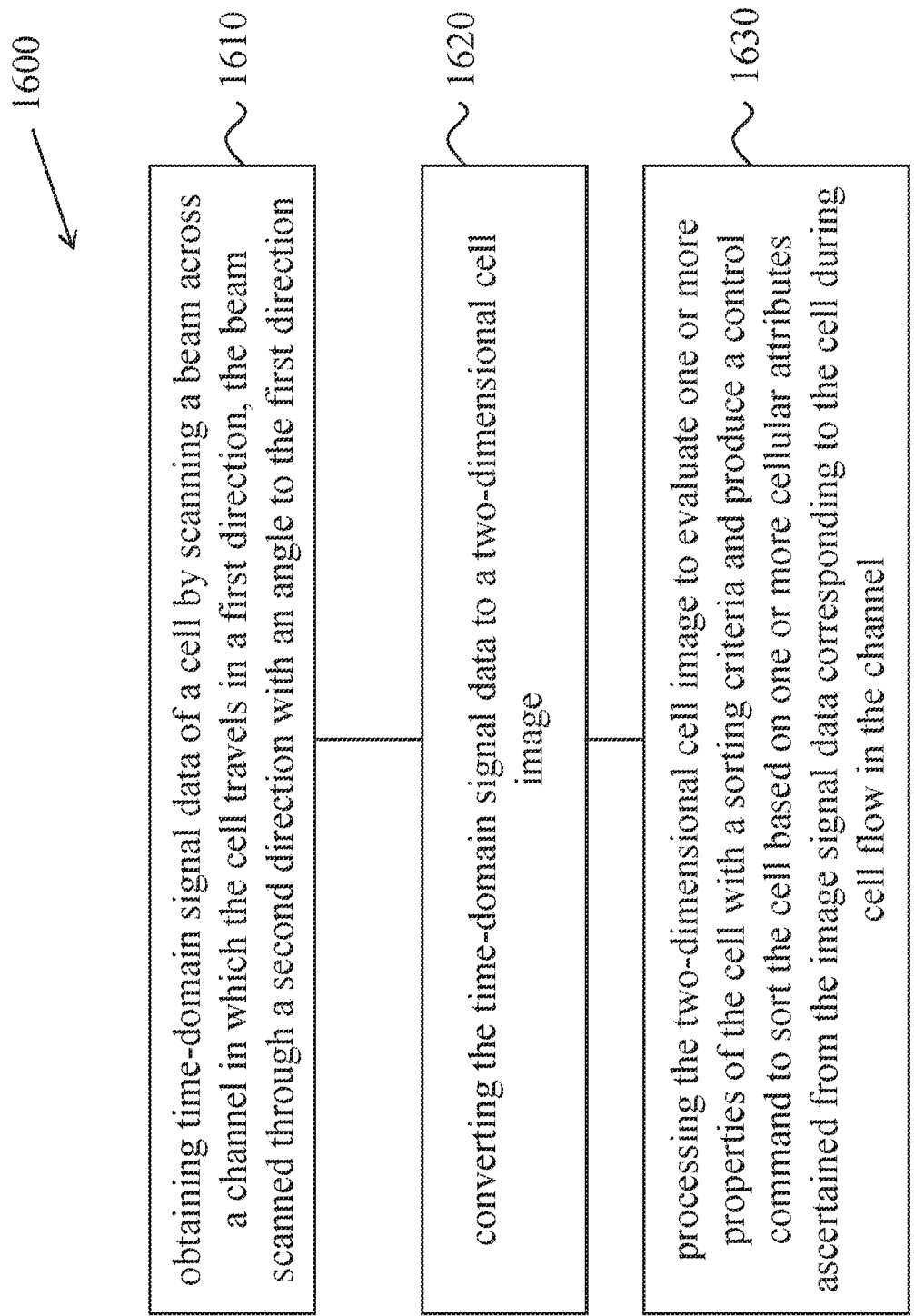
FIGS. 16-18 show flowcharts of example methods for sorting cells based on some implementations of the disclosed technology.

FIG. 16 shows a flowchart of an example method for sorting sells based on some implementations of the disclosed technology. The method 1600 includes, at step 1610, obtaining time-domain signal data of a cell by scanning a beam across a channel in which the cell travels in a first direction, the beam scanned through a second direction with an angle to the first direction. The method 1600 further includes, at step 1620, converting the time-domain signal data to a two-dimensional cell image. The method 1600 further includes, at step 1630, processing the two-dimensional cell image to evaluate one or more properties of the cell with a sorting criteria and produce a control command to sort the cell based on one or more cellular attributes ascertained from the image signal data corresponding to the cell during cell flow in the channel.

Figure 17:
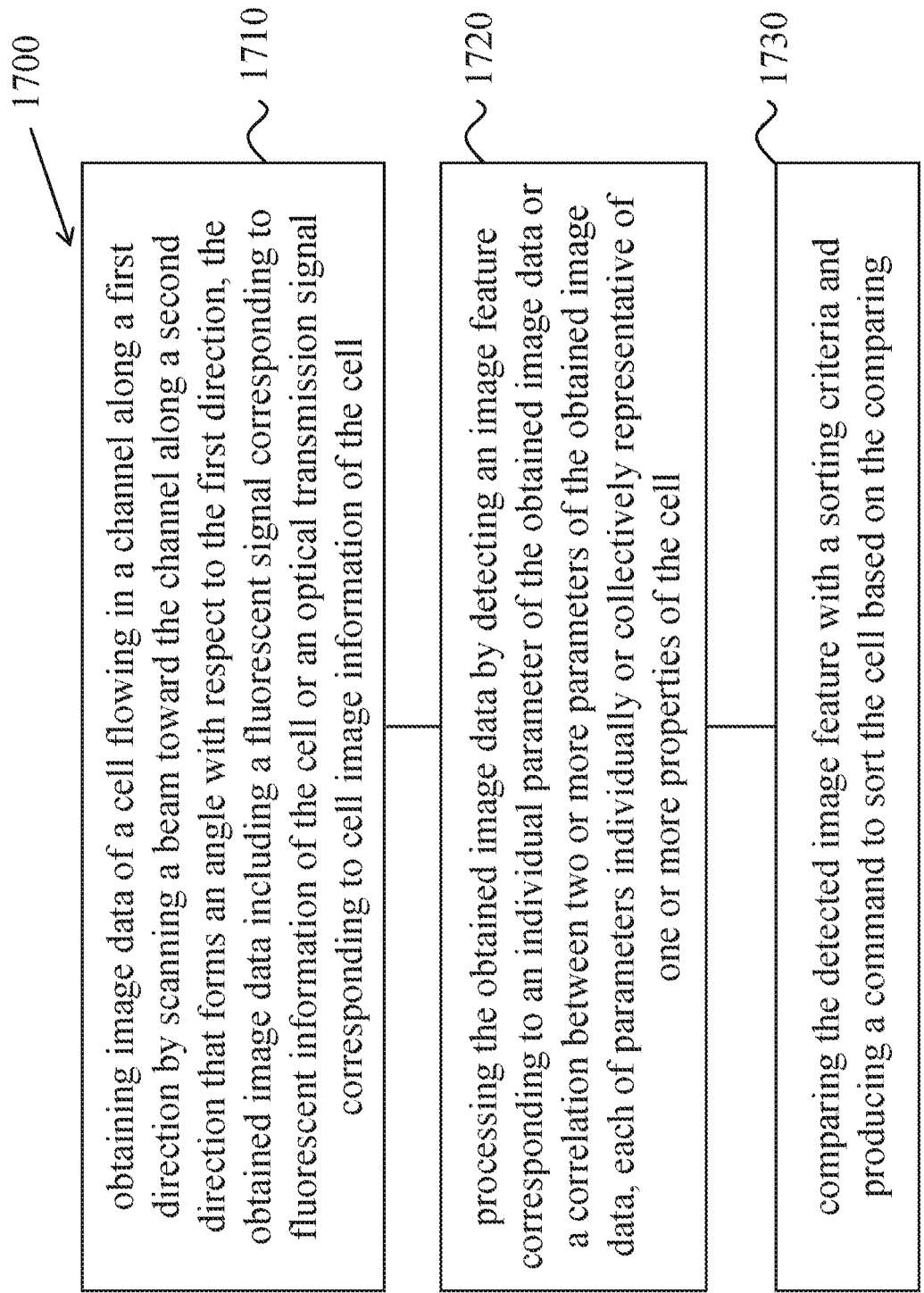

FIG. 17 shows a flowchart of an example method for sorting sells based on some implementations of the disclosed technology. The method 1700 includes, at step 1710, obtaining image data of a cell flowing in a channel along a first direction by scanning a beam toward the channel along a second direction that forms an angle with respect to the first direction, the obtained image data including a fluorescent signal corresponding to fluorescent information of the cell or an optical transmission signal corresponding to cell image information of the cell. The method 1700 further includes, at step 1720, processing the obtained image data by detecting an image feature corresponding to an individual parameter of the obtained image data or a correlation between two or more parameters of the obtained image data, each of parameters individually or collectively representative of one or more properties of the cell. The method 1700 further includes, at step 1730, comparing the detected image feature with a sorting criteria and producing a command to sort the cell based on the comparing.

Figure 18:
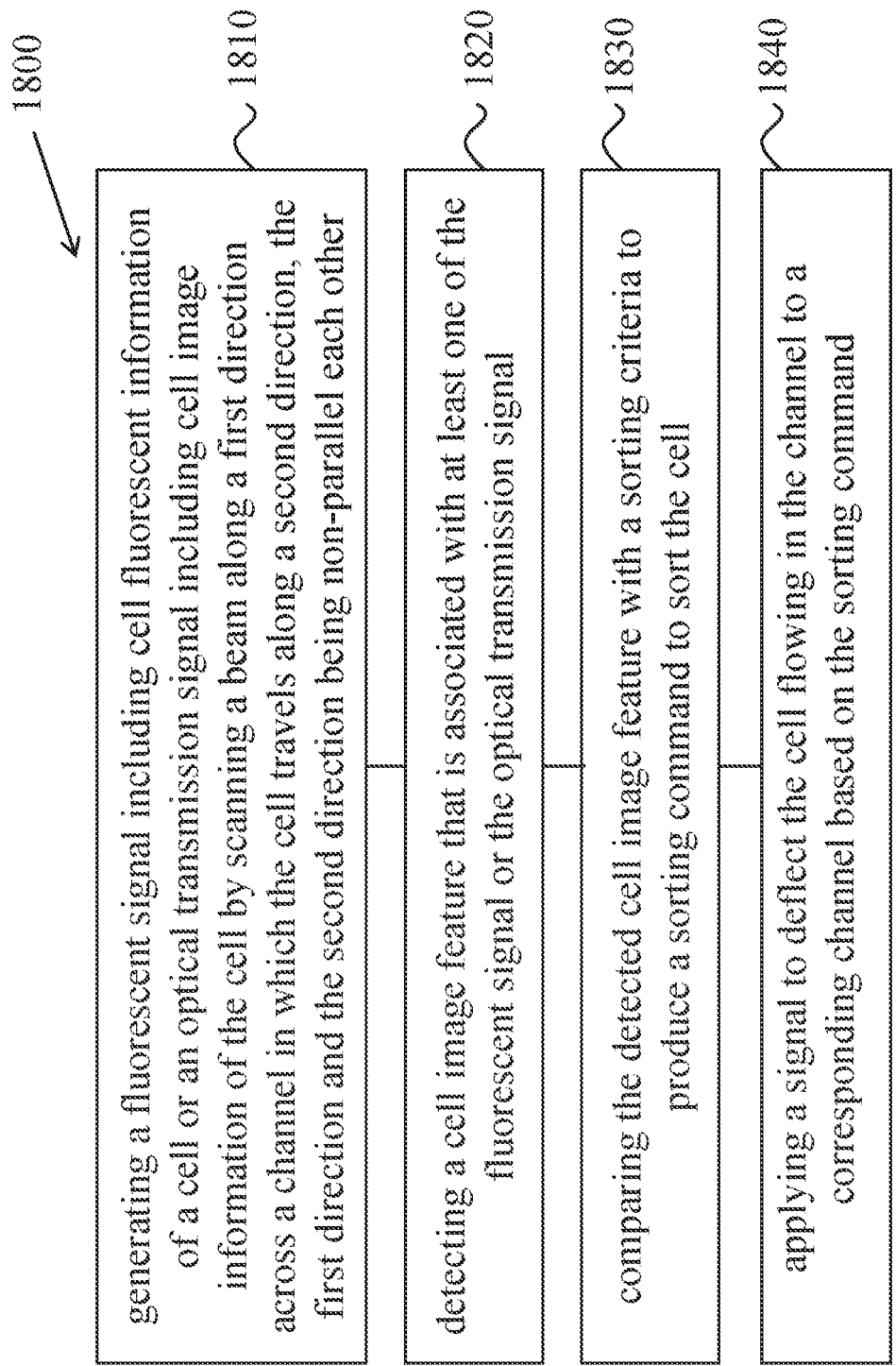

FIG. 18 shows a flowchart of an example method for sorting sells based on some implementations of the disclosed technology. The method 1800 includes, at step 1810, generating a fluorescent signal including cell fluorescent information of a cell or an optical transmission signal including cell image information of the cell by scanning a beam along a first direction across a channel in which the cell travels along a second direction, the first direction and the second direction being non-parallel each other. The method 1800 further includes, at step 1820, detecting a cell image feature that is associated with at least one of the fluorescent signal or the optical transmission signal. The method 1800 further includes, at step 1830, comparing the detected cell image feature with a sorting criteria to produce a sorting command to sort the cell. The method 1800 further includes, at step 1840, applying a signal to deflect the cell flowing in the channel to a corresponding channel based on the sorting command.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A cell sorting system, comprising:
   a) an imaging device comprising a beam scanner configured to scan a beam along a first direction to obtain a cell image data comprising fluorescent information or cell image information of a cell, wherein the imaging device is configured to scan the cell flowing in a channel along a second direction, wherein the second direction is at an angle with respect to the first direction;
   b) a data processing and control device in communication with the imaging device, wherein the data processing and control device comprises a processor configured to
      (i) convert the cell image data obtained by the imaging device to an initial two-dimensional (2D) cell image,
      (ii) perform a phase-shift correction of the initial 2D cell image to produce a phase-shift corrected image,
      (iii) correct the phase-shift corrected image for distortion caused by effect of cell travelling speed to thereby produce processed cell image data,
      (iv) determine one or more properties of the cell associated with imaging features of the processed cell image data,
      (v) compare the imaging features associated with the determined one or more properties to a sorting criteria comprising machine-learning-defined and/or user-defined imaging features, and
      (vi) produce a control command based on the comparison, wherein the control command is produced during the cell flowing in the channel;
   c) a cell sorting device in communication with the imaging device and the data processing and control device, wherein the cell sorting device comprises two or more output paths coupled to the channel in which the cell flows and is configured to direct the cell into one of the two or more output paths in response to the control command, wherein the phase-shift correction comprises determining a phase shift from an intensity profile of the cell image data and shifting the cell image data by the phase shift to correct effects on the initial 2D cell image caused by time delay between a voltage applied to the beam scanner and corresponding beam spot.

2. The cell sorting system of claim 1, wherein the sorting criteria is predetermined, and the data processing and control device is in communication with a client device to receive an additional command to adjust the predetermined sorting criteria from the client device.

3. The cell sorting system of claim 1, wherein the imaging device further comprises:
   a LED light source configured to provide a LED light to pass through the cell in the channel; and
   a first spatial mask comprising two or more slits separated in the second direction and configured to obtain a travelling speed of the cell flowing in the channel, wherein the LED light that has already passed through the cell passes through the first spatial mask before reaching a photodetector producing a photocurrent.

4. The cell sorting system of claim 3, wherein the imaging device further comprises:
   a second spatial mask arranged on an image plane of the beam and configured to block unnecessary light as an optical window.

5. The cell sorting system of claim 1, wherein the beam scanner comprises an Acousto-Optic Deflector (AOD) beam scanner.

6. The cell sorting system of claim 5, wherein the AOD beam scanner is operatively coupled with a laser light source configured to direct an input light toward the cell in the channel.

7. The cell sorting system of claim 1, wherein the imaging device further comprises an objective lens structured to illuminate an input light within the channel or assist a capturing of the cell image data from the cell illuminated by the input light.

8. The cell sorting system of claim 7, wherein the imaging device further comprises one or more light guide elements comprising a dichroic mirror configured to direct the input light to the channel, configured to direct light emitted or scattered by the cell to an image plane of the imaging system, or both.

9. The cell sorting system of claim 1, wherein the imaging device comprises a photomultiplier tube (PMT) configured to generate a corresponding time-domain signal based on a detection of light emitted or scattered by the cell.

10. The cell sorting system of claim 1, wherein the processor of the data processing and control device is further configured to perform an image resizing operation to correct an error caused by an effect of a travelling speed of the cell.

11. The cell sorting system of claim 1, wherein processor is further configured to perform operations comprising:
creating, for cells, representations of distributions of parameters of the sorting criteria;
receiving, from a user device, a user-defined sorting criteria comprising a threshold value for a selected set of the representations; and
displaying a cell satisfying the user-defined sorting criteria.

12. The cell sorting system of claim 1, wherein the processor of the data processing and control device comprises a field-programmable gate-array (FPGA), a graphics processing unit (GPU), or a FPGA and a GPU in combination.

13. The cell sorting system of claim 1, wherein the imaging device is configured to produce the cell image data including a fluorescent time-domain waveform corresponding to the fluorescent information of the cell or an optical transmission time-domain waveform corresponding to the cell image information of the cell, wherein the optical transmission time-domain waveform is obtained from a remaining part of light after being scattered and transmitted through the cell.

14. The cell sorting system of claim 1, wherein the one or more properties of the cell comprise one or more selected from an amount of a feature of or on the cell, a size of a feature of or on the cell, one or more particles attached to the cell, and a particular morphology of the cell or portion of the cell.

15. The cell sorting system of claim 1, wherein the one or more properties of the cell comprise a physiological property of the cell comprising a cell life cycle phase, an expression or localization of a protein by the cell, an expression or localization of a gene by the cell, a damage to the cell, or an engulfment of a substance or a particle by the cell.

16. The cell sorting system of claim 1, wherein the sorting criteria comprises a cell contour, a cell size, a cell shape, a nucleus size, a nucleus shape, a fluorescent pattern, or a fluorescent color distribution.

17. A method for sorting cells, comprising:
(a) obtaining time-domain signal data of a cell by scanning a beam across a channel in which the cell travels in a first direction, wherein the beam scans through a second direction at an angle with respect to the first direction;
(b) converting the time-domain signal data to an initial two-dimensional (2D) cell image,
(c) performing a phase-shift correction of the initial 2D cell image to produce a phase-shift corrected image,
(d) correcting the phase-shift corrected image for distortion caused by effect of cell travelling speed to thereby produce processed cell image data,
(e) determining one or more properties of the cell associated with imaging features of the processed cell image data,
(f) comparing the imaging features associated with the determined one or more properties to a sorting criteria comprising machine-learning-defined and/or user-defined imaging features,
(g) producing a control command based on the comparison, wherein the control command is produced during the cell flowing in the channel, and
(h) directing the cell into one of two or more output paths in response to the control command,
wherein the phase-shift correction comprises determining a phase shift from an intensity profile of the cell image data and shifting the cell image data by the phase shift to correct effects on the initial 2D cell image caused by time delay between a voltage applied to the beam scanner and corresponding beam spot.

18. The method of claim 17, further comprising:
creating, for cells, representations of distributions of parameters of the sorting criteria;
receiving, from a user device, a user-defined sorting criteria including a threshold value for a selected set of the representations; and
displaying a cell satisfying the user-defined sorting criteria.

19. The method of claim 17, wherein the one or more properties of the cells comprise one or more selected from an amount of a feature of or on the cell, a size of a feature of or on the cell, one or more particles attached to the cell, a particular morphology of the cell or portion of the cell, a cell life cycle phase, an expression or localization of a protein by the cell, an expression or localization of a gene by the cell, a damage to the cell, and an engulfment of a substance or a particle by the cell.

\* \* \* \* \*